US012785437B2

(12) United States Patent
Kim

(10) Patent No.: US 12,785,437 B2
(45) Date of Patent: Nov. 3, 2026

(54) ELECTRONIC DEVICE AND OPERATION METHOD THEREOF

(71) Applicant: SAMSUNG ELECTRONICS CO., LTD., Suwon-si (KR)

(72) Inventor: Kyoungwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 988 days.

(21) Appl. No.: 18/060,267

(22) Filed: Nov. 30, 2022

(65) Prior Publication Data

US 2023/0088905 A1 Mar. 23, 2023

Related U.S. Application Data

(63) Continuation of application No. PCT/KR2022/009644, filed on Jul. 5, 2022.

(30) Foreign Application Priority Data

Sep. 8, 2021 (KR) ........................ 10-2021-0119968

(51) Int. Cl.
*H02J 7/00* (2026.01)
*G01R 19/165* (2006.01)
(Continued)

(52) U.S. Cl.
CPC *H02J 7/94* (2026.01); *H02J 7/42* (2026.01); *H02J 7/80* (2026.01); *H02J 7/96* (2026.01)

(58) Field of Classification Search
CPC ............... H02J 7/00714; H02J 7/00034; H02J 7/007182; H02J 7/0047
(Continued)

(56) References Cited

U.S. PATENT DOCUMENTS 10,237,830 B1 3/2019 Jia et al.
2016/0064959 A1* 3/2016 Jung .................. H02J 7/00034
(Continued)

FOREIGN PATENT DOCUMENTS

EP 3 813 221 4/2021
KR 10-1998-0046508 9/1998
(Continued)

OTHER PUBLICATIONS

Extended European Search Report dated Oct. 8, 2024 issued in European Patent Application No. 22867524.5.
International Search Report for PCT/KR2022/009644 mailed Oct. 11, 2022, 3 pages.

*Primary Examiner* — Drew A Dunn
*Assistant Examiner* — Pamela J Jeppson
(74) *Attorney, Agent, or Firm* — NIXON & VANDERHYE P.C.

(57) ABSTRACT

According to example embodiments, an electronic device includes: a battery; a first circuit configured to communicate with an external power supply device; a charging circuit configured to charge the battery using the received power; a power sensor configured to measure an input current of the battery; and a processor configured to: transmit an initially requested current value to the external power supply device through the first circuit, receive a first input current value of the battery from the power sensor, transmit a first requested current value to the external power supply device through the first circuit based on a difference between the first input current value and the initially requested current value being out of a first range, receive a second input current value of the battery from the power sensor, determine whether a difference between the initially requested current value and the first requested current value is greater than a threshold based on a difference between the second input current value and the initially requested current value being out of the first
(Continued)

range, and request the external power supply device for voltage decrease through the first circuit based on the difference between the initially requested current value and the first requested current value being greater than the threshold.

20 Claims, 13 Drawing Sheets

(51) Int. Cl.

| | |
|---|---|
| ***G01R 31/382*** | (2019.01) |
| ***H02J 7/42*** | (2026.01) |
| ***H02J 7/80*** | (2026.01) |
| ***H02J 7/94*** | (2026.01) |
| ***H02J 7/96*** | (2026.01) |

(58) Field of Classification Search
USPC .......................................................... 320/162
See application file for complete search history.

(56) References Cited

U.S. PATENT DOCUMENTS

| | | | | |
|---|---|---|---|---|
| 2016/0268833 | A1* | 9/2016 | Lee | H02J 50/12 |
| 2017/0148232 | A1* | 5/2017 | Lee | B60L 58/15 |
| 2018/0090946 | A1 | 3/2018 | Melgar et al. | |
| 2018/0102663 | A1 | 4/2018 | Jung et al. | |
| 2018/0183268 | A1* | 6/2018 | Matsuno | H02J 50/12 |
| 2019/0393716 | A1 | 12/2019 | Tian et al. | |
| 2021/0075244 | A1 | 3/2021 | Cho et al. | |
| 2021/0111577 | A1 | 4/2021 | Kang et al. | |

FOREIGN PATENT DOCUMENTS

| | | |
|---|---|---|
| KR | 10-0706437 | 4/2007 |
| KR | 10-1303164 | 8/2013 |
| KR | 10-2015-0010460 | 1/2015 |
| KR | 10-2019-0100601 | 8/2019 |
| KR | 10-2021-0042751 | 4/2021 |
| KR | 10-2259113 | 5/2021 |

* cited by examiner

810

| PD Data | Index |
|---|---|
| 8 | 0 |

| PDO Type | DRP | Suspend | UP | USB Comm | DRD | Unchunked | Peak | Fixed |
|---|---|---|---|---|---|---|---|---|
| Fixed | 0 | 0 | 1 | 0 | 0 | 0 | 0 | 5.00V Max 3.00A |

820

| PD Data | Index |
|---|---|
| 9 | 1 |

| PDO Type | DRP | Suspend | UP | USB Comm | DRD | Unchunked | Peak | Fixed |
|---|---|---|---|---|---|---|---|---|
| Fixed | 0 | 0 | 0 | 0 | 0 | 0 | 0 | 9.00V Max 3.00A |

830

| PD Data | Index |
|---|---|
| 10 | 2 |

| PDO Type | DRP | Suspend | UP | USB Comm | DRD | Unchunked | Peak | Fixed |
|---|---|---|---|---|---|---|---|---|
| Fixed | 0 | 0 | 0 | 0 | 0 | 0 | 0 | 12.00V Max 3.00A |

840

| PD Data | Index |
|---|---|
| 11 | 3 |

| PDO Type | DRP | Suspend | UP | USB Comm | DRD | Unchunked | Peak | Fixed |
|---|---|---|---|---|---|---|---|---|
| Fixed | 0 | 0 | 0 | 0 | 0 | 0 | 0 | 15.00V Max 3.00A |

850

| PD Data | Index |
|---|---|
| 12 | 4 |

| PDO Type | DRP | Suspend | UP | USB Comm | DRD | Unchunked | Peak | Fixed |
|---|---|---|---|---|---|---|---|---|
| Fixed | 0 | 0 | 0 | 0 | 0 | 0 | 0 | 20.00V Max 3.00A |

860

| PD Data | Index |
|---|---|
| 13 | 5 |

| PDO Type | Prog power supply | Augmented |
|---|---|---|
| Augmented | 0 | 3.30V ~ 21.00V Max 3.00A |

FIG.8

ELECTRONIC DEVICE AND OPERATION METHOD THEREOF

CROSS-REFERENCE TO RELATED APPLICATIONS

This application is a continuation of International Application No. PCT/KR2022/009644 designating the United States, filed on Jul. 5, 2022, in the Korean Intellectual Property Receiving Office and claiming priority to Korean Patent Application No. 10-2021-0119968 filed on Sep. 8, 2021, in the Korean Intellectual Property Office, the disclosures of which are incorporated by reference herein in their entireties.

BACKGROUND

1. Field

The disclosure relates to an electronic device and a method of operating the electronic device.

2. Description of Related Art

An electronic device may include a battery and operate with power supplied by the battery. The battery may be charged by an external power supply (e.g., an adapter) through various charging methods (e.g., normal charging, fast charging, or super-fast charging). For example, the battery may be charged with a constant current, and with a constant voltage when a voltage of the battery reaches a certain voltage while being charged with the constant current.

When current control (or voltage control) by an adapter based on a request from an electronic device does not operate normally, the electronic device may not charge a battery with a desired current (or voltage). In such a situation where the current control (or voltage control) of the adapter is not normally operating, the electronic device may need to stably charge the battery.

SUMMARY

Embodiments of the disclosure provide an electronic device that requests an adapter for voltage control when current control of the adapter does not normally operate.

Embodiments of the disclosure provide an electronic device that requests an adapter for current control when voltage control of the adapter does not normally operate.

However, technical aspects of the present disclosure are not limited to the foregoing aspects, and other technical aspects may also be present.

According to an example embodiment, an electronic device includes: a battery; a first circuit configured to communicate with an external power supply device; a charging circuit configured to receive power from the external power supply device and charge the battery using the received power; a power sensor configured to measure an input current of the battery; and a processor configured to control the electronic device to: transmit an initially requested current value to the external power supply device through the first circuit, receive a first input current value of the battery from the power sensor, transmit a first requested current value to the external power supply device through the first circuit based on a difference between the first input current value and the initially requested current value being out of a first range, receive a second input current value of the battery from the power sensor, determine whether a difference between the initially requested current value and the first requested current value is greater than a threshold based on a difference between the second input current value and the initially requested current value being out of the first range, and request the external power supply device for voltage decrease through the first circuit based on the difference between the initially requested current value and the first requested current value being greater than the threshold.

According to an example embodiment, an electronic device includes: a battery; a first circuit configured to communicate with an external power supply device; a charging circuit configured to receive power from the external power supply device and charge the battery using the received power; a power sensor configured to measure an input current of the battery; and a processor configured to control the electronic device to: transmit an initially requested current value and an initially requested voltage value to the external power supply device through the first circuit, receive a first input current value of the battery from the power sensor, transmit a first requested voltage value to the external power supply device through the first circuit based on a difference between the first input current value and the initially requested current value being out of a first range, receive a second input current value of the battery from the power sensor, determine whether a difference between the initially requested voltage value and the first requested voltage value is greater than a threshold based on a difference between the second input current value and the initially requested current value being out of the first range, and request the external power supply device for current decrease through the first circuit based on the difference between the initially requested voltage value and the first requested voltage value being greater than the threshold.

According to an example embodiment, a method of operating an electronic device includes: transmitting an initially requested current value to an external power supply device; receiving first power from the external power supply device, charging a battery using the received first power, and measuring an input current of the battery; transmitting a first requested current value to the external power supply device based on a difference between a first input current value of the battery and the initially requested current value being out of a first range; receiving second power from the external power supply device, charging the battery using the received second power, and measuring an input current of the battery; determining whether the difference between the initially requested current value and the first requested current value is greater than a threshold based on a second input current value of the battery and the initially requested current value being out of the first range; and requesting the external power supply device for voltage decrease based on the difference between the initially requested current value and the first requested current value being greater than the threshold.

According to various example embodiments described herein, an electronic device may request voltage control from an adapter that does not normally perform current control to stably receive a desired current and reduce a charging time.

According to various example embodiments described herein, an electronic device may request current control from an adapter that does not normally perform voltage control to stably receive a desired current and reduce a charging time.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a diagram illustrating example adapter information according to various embodiments;

DETAILED DESCRIPTION

Figure 1:
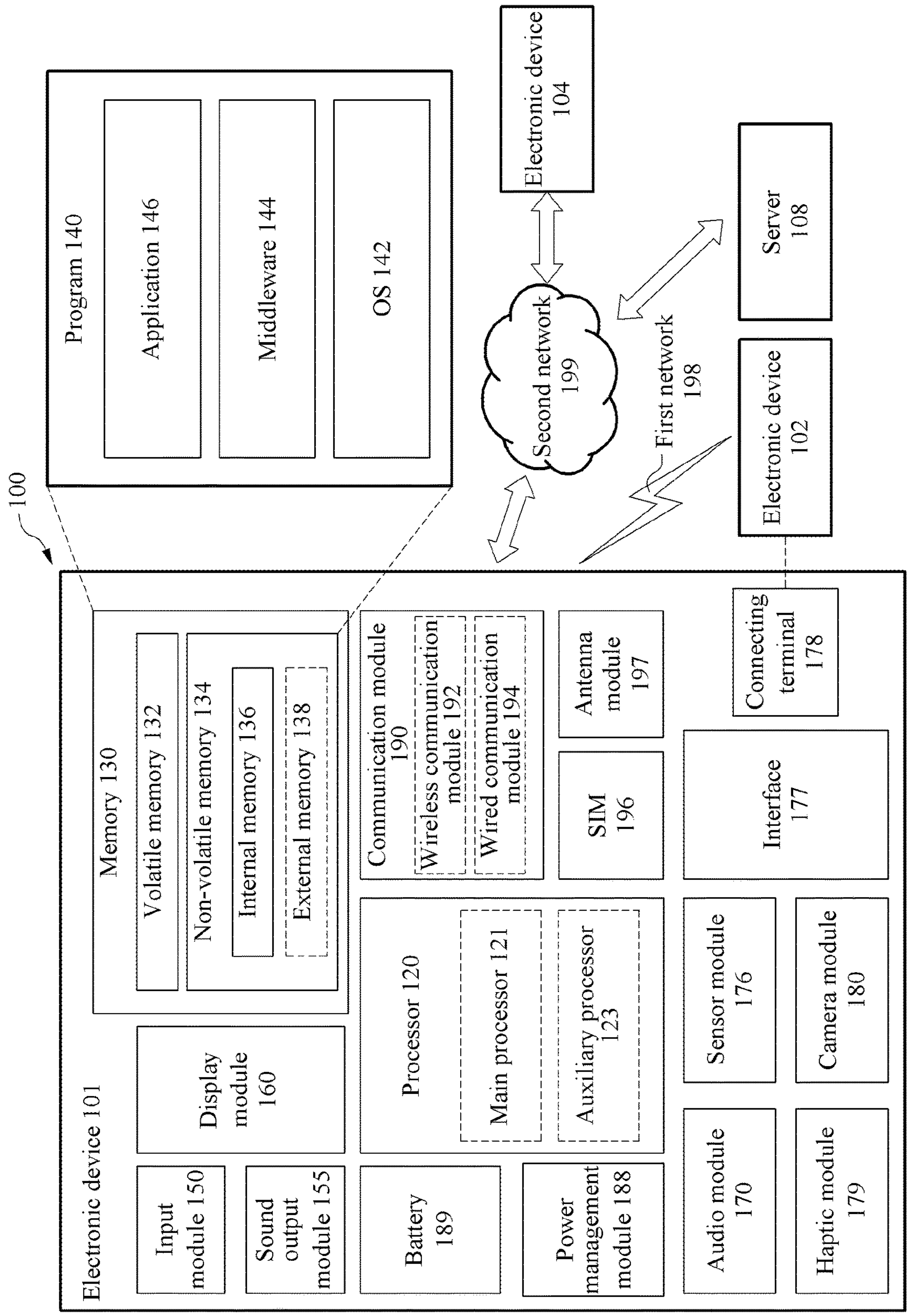
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch. For example, the display module 160 may be implemented in a foldable structure and/or rollable structure. For example, a size of a display screen of the display module 160 may be reduced when folded yet expanded when unfolded.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
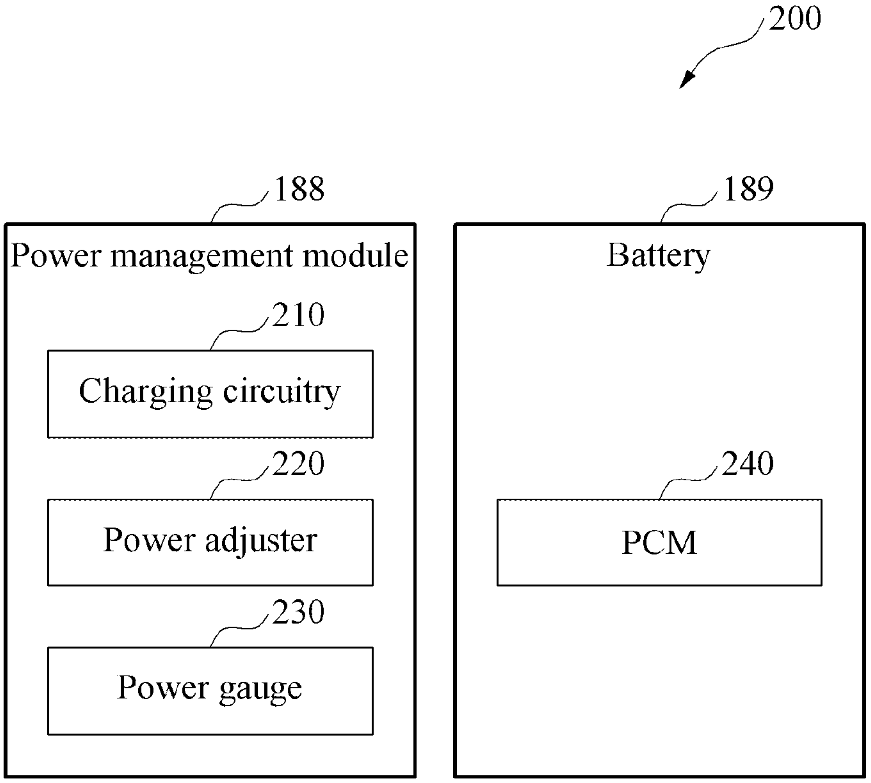
FIG. 2 is a block diagram illustrating an example configuration of a power management module and an example battery according to various embodiments.

FIG. 2 is a block diagram 200 illustrating an example configuration of a power management module and an example battery according to various embodiments.

Referring to FIG. 2, the power management module 188 may include various circuitry including, for example, charging circuitry 210, a power adjuster (e.g., including power adjusting circuitry) 220, and/or a power gauge 230. The charging circuitry 210 may charge the battery 189 using power supplied from an external power supply outside the electronic device 101. According to an example embodiment, the charging circuitry 210 may select a charging method (e.g., normal charging or quick charging) based at least in part on a type of the external power supply (e.g., a power adapter, a USB, or a wireless charger), a magnitude of power suppliable from the external power supply (e.g., approximately 20 watts or greater), or an attribute of the battery 189, and may charge the battery 189 using the selected charging method. The external power supply may be connected to the electronic device 101, for example, directly via the connecting terminal 178 or wirelessly via the antenna module 197.

The power adjuster 220 may include various power adjusting circuitry and generate a plurality of powers having different voltage levels or different current levels by adjusting a voltage level or a current level of the power supplied from the external power supply or the battery 189. The power adjuster 220 may adjust the voltage level or the current level of the power supplied from the external power supply or the battery 189 to be different voltage levels or current levels respectively suitable for some of the components included in the electronic device 101. The power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, overvoltage, low voltage, overcurrent, overcharge, over-discharge, overheat, short, or swelling) related to the charging of the battery 189 based at least in part on the measured use state information about the battery 189. The power management module 188 may determine whether a state of the battery 189 is normal or abnormal based at least in part on the determined charging state information. When the state of the battery 189 is determined to be abnormal, the power management module 188 may adjust the charging of the battery 189 (e.g., reduce a charging current or voltage, or stop the charging). According to an example embodiment, at least some of the functions of the power management module 188 may be performed by an external control device (e.g., the processor 120).

According to an example embodiment, the battery 189 may include a protection circuit module (PCM) 240. The PCM 240 may include various circuitry and perform one or more of various functions (e.g., a pre-cutoff function) to prevent/reduce a performance deterioration of, or a damage to, the battery 189. The PCM 240 may be, additionally or alternatively, configured as at least part of a battery management system (BMS) capable of performing various functions including cell balancing, measuring battery capacity, counting the number of times of charging or discharging, and measuring a temperature or a voltage.

According to an example embodiment, at least part of the charging state information or use state information of the battery 189 may be measured using a corresponding sensor (e.g., a temperature sensor) of a sensor module 176, the power gauge 230, or the power management module 188. The corresponding sensor (e.g., a temperature sensor) of the sensor module 176 may be included as part of the PCM 240, or may be disposed near the battery 189 as a separate device.

According to various example embodiments, an electronic device described herein may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be appreciated that various embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
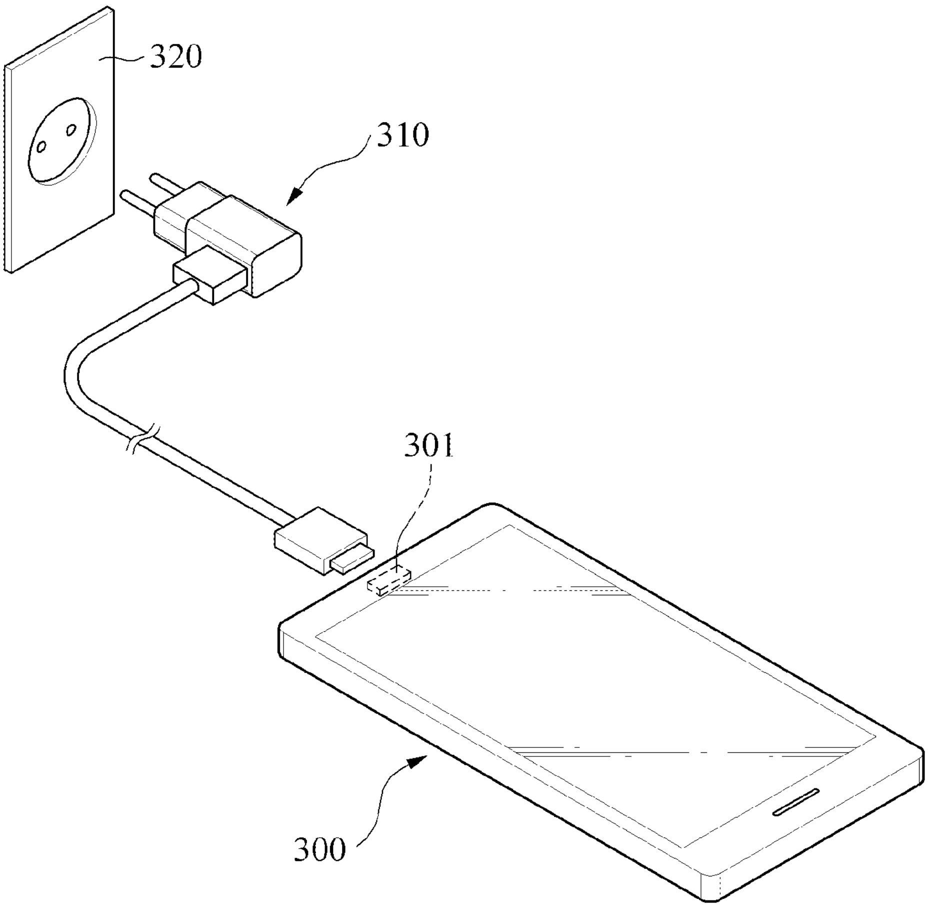
FIG. 3 is a diagram illustrating an example charging environment for an electronic device according to various embodiments.

FIG. 3 is a diagram illustrating an example charging environment for an electronic device according to various embodiments.

Referring to FIG. 3, a charging environment may include an adapter (e.g., a travel adapter (TA)) 310 and an electronic device 300 (e.g., the electronic device 101 of FIG. 1). The electronic device 300 may include, for example, a smartphone, a smartwatch, smart glasses, or a laptop computer, but is not limited thereto. The smart glasses may provide virtual reality (VR), augmented reality (AR), or mixed reality (MR) to a user through a display.

The adapter 310 may support USB power delivery (USB PD), but examples are not limited thereto. The adapter 310 may, for example, support the USB PD and programmable power supply (PPS).

According to various example embodiments, the electronic device 300 may include a connecting terminal 301 (e.g., the connecting terminal 178 of FIG. 1). Into the connecting terminal 301, one side of a cable of the adapter 310 may be inserted. The connecting terminal 301 may include, for example, a USB Type-C terminal, but is not limited thereto.

The adapter 310 may be electrically connected to a power supply 320 and transmit or supply power supplied from the power supply 320 to the electronic device 310. The adapter 310 may receive alternating current (AC) power from the power supply 320 and convert the AC power into direct current (DC) power, and transmit or supply the DC power to the electronic device 300.

The electronic device 300 may receive power from an accessory (e.g., an auxiliary battery) or another external electronic device (e.g., a smartphone or tablet).

Figure 4:
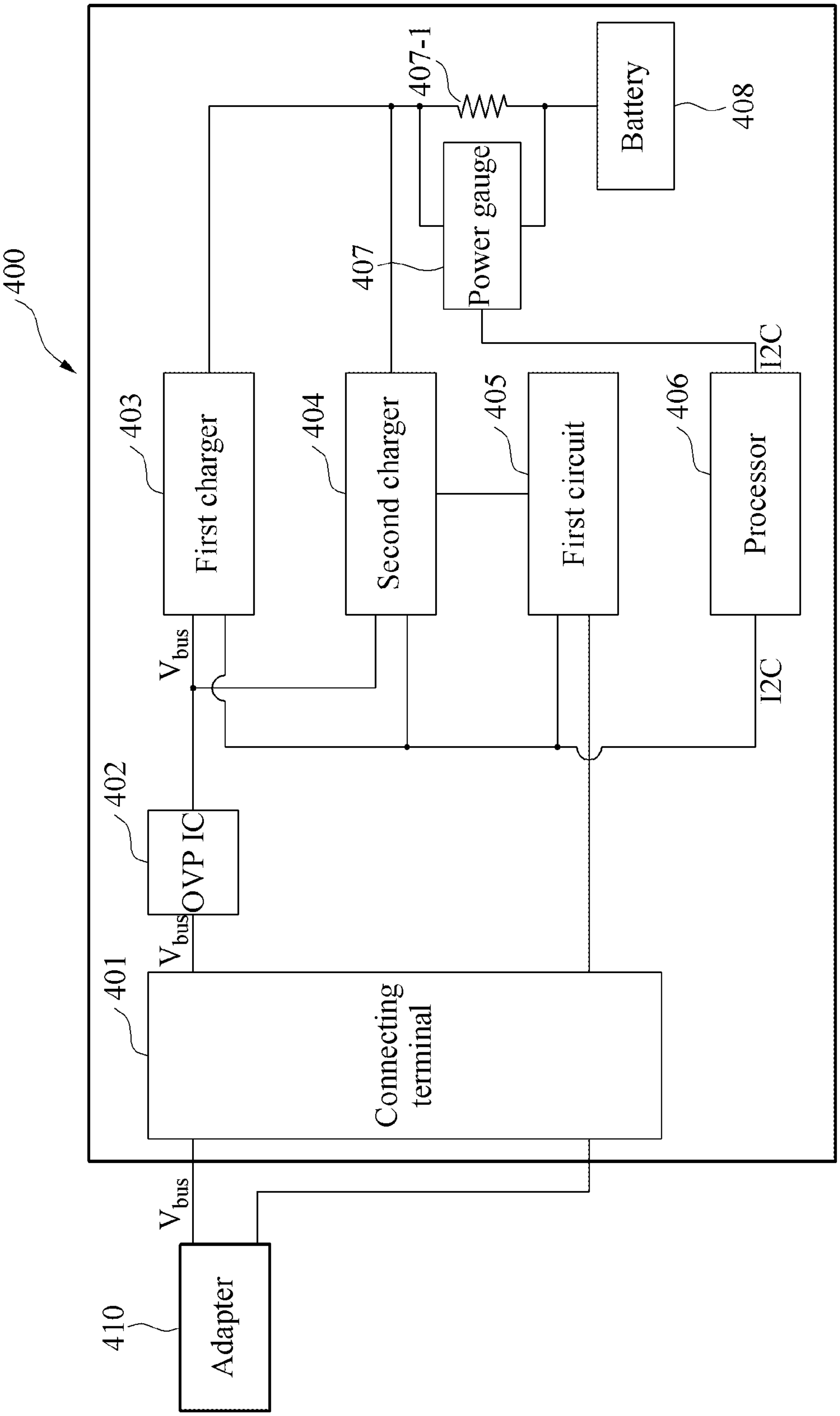
FIG. 4 is a block diagram illustrating an example configuration of an electronic device according to various embodiments.

FIG. 4 is a block diagram illustrating an example configuration of an electronic device according to various embodiments.

Referring to FIG. 4, an electronic device 400 (e.g., the electronic device 101 of FIG. 1 and the electronic device 300 of FIG. 3) may include a connecting terminal 401 (e.g., the connecting terminal 178 of FIG. 1 and the connecting terminal 301 of FIG. 3), an overvoltage protection integrated circuit (OVP IC) 402, a first charger 403 (e.g., the charging circuitry 210 of FIG. 2), a second charger 404, a first circuit 405, a processor (e.g., including processing circuitry) 406 (e.g., the processor 120 of FIG. 1), a power gauge 407 (e.g., the power gauge 230 of FIG. 2), and a battery 408 (e.g., the battery 189 of FIG. 1). At least one of the components of the electronic device 400 may be the same as or similar to a corresponding one of the components of the electronic device 101 of FIG. 1, and a repeated and detailed description thereof may not be repeated here for brevity.

The connecting terminal 401 may be connected to a cable of an adapter 410 (e.g., the adapter 310 of FIG. 3). The connecting terminal 401 may include a plurality of pins. For example, the connecting terminal 401 may include one or more VBUS pins used for receiving power from the adapter 410, one or more communication pins used for communication between the electronic device 400 (or the processor 406) and the adapter 410, and one or more ground pins. The communication pins may include a configuration channel (CC) pin, a D+ pin, and a D− pin.

The connecting terminal 401 may receive power from the adapter 410 through the VBUS pins, and transmit the received power to the first charger 403 and/or the second charger 404 through the OVP IC 402.

When a voltage of the power received from the adapter 410 is less than a certain level, the OVP IC 402 may transmit the received power to the first charger 403 and/or the second charger 404. When the voltage of the power received from the adapter 410 is greater than or equal to the level, the OVP IC 402 may turn off a switch in the OVP IC 402 to allow the power not to be output from the OVP IC 402, thereby protecting components of the electronic device 400 from the power of such an overvoltage.

The first circuit 405 may receive adapter information from the adapter 410 through the communication pins (e.g., the CC pins) of the connecting terminal 401. The adapter information may include, for example, information associated with a voltage and current that may be supplied by the adapter 410. The adapter information will be described in greater detail below with reference to FIG. 8.

The first circuit 405 may be a configuration channel power delivery (CCPD) circuit.

The first charger 403 may charge the battery 408. The first charger 403 may be a charger that does not support direct charging. Direct charging may refer, for example, to a charging method of providing power received from the adapter 410 directly to the battery 408. Direct charging may be a method for super-fast charging. Direct charging may include a constant current mode (hereinafter a "CC mode") that charges the battery 408 with a constant current and a constant voltage mode (hereinafter a "CV mode") that charges the battery 408 with a constant voltage.

The second charger 404 may charge the battery 408. The second charger 404 may be a charger that supports direct charging. In an example embodiment, the second charger 404 may include a switched-capacitor voltage divider (SCVD). The SCVD will be described in greater detail below with reference to FIGS. 5A and 5B. In an example embodiment, the second charger 404 may include an interleaved dual phase Dickson structure. The interleaved dual phase Dickson structure will be described in detail below with reference to FIG. 6.

The processor 406 may include various processing circuitry and communicate with the components (e.g., the first charger 403, the second charger 404, the first circuit 405, and the power gauge 407) in the electronic device 400 through an inter-integrated circuit (I2C) method.

The processor 406 may allow the battery 408 to be charged selectively by any one of the first charger 403 and the second charger 404, or allow the battery 408 to be charged using the first charger 403 and the second charger 404.

The power gauge 407 may determine state information (e.g., charging state information and/or voltage information) of the battery 408.

In an example embodiment, the power gauge 407 may include a power sensor (not shown) configured to measure an input current of the battery 408. When a current is supplied to the battery 408, a voltage drop may occur by a resistor 407-1. The power sensor may measure the voltage drop at both ends of the resistor 407-1, and calculate an input current value of the battery 408 using a resistance value and a voltage drop value. The power sensor may transmit the input current value of the battery 408 to the processor 406. In another example embodiment, the power sensor may be physically separate from the power gauge 407.

The processor 406 may receive the adapter information from the first circuit 405 and receive the state information of the battery 408 from the power gauge 407. The processor 406 may verify whether the adapter 410 supports direct charging (or PPS) using the adapter information.

For example, the processor 406 may allow the battery 408 to be charged by the first charger 403 when the adapter 410 does not support direct charging, and allow the battery 408 to be charged by the second charger 404 when the adapter 410 supports direct charging.

When the adapter 410 supports direct charging, the processor 406 may determine (or select) an initial request value (e.g., an initially requested current value and/or initially requested voltage value) of direct charging. For example, the processor 406 may determine the initially requested current value to be 2770 milliamperes (mA) and the initially requested voltage value to be 9 volts (V), but examples of which are not limited thereto. The processor 406 may transmit the determined initial request value to the adapter 410 through the first circuit 405.

The second charger 404 may receive, from the adapter 410, power corresponding to the initially requested current value and the initially requested voltage value. The second charger 404 may monitor a current (or input current) of the power received from the adapter 410 through an analog-to-digital converter (ADC) (not shown), and transmit an input current value (or a value of the input current) to the processor 406. The processor 406 may determine whether a difference between the input current value of the second charger 404 and the initially requested current value is in a first range (e.g., −50 mA to 50 mA), and allow the battery 408 to be charged by the second charger 404 in the CC mode when the difference between the input current value of the second charger 404 and the initially requested current value is in the first range.

The second charger 404 may receive, from the adapter 410, power of which a current and/or voltage is different from a requested current level and/or requested voltage level. In this case, the processor 406 may determine that the difference between the input current value of the second charger 404 and the initially requested current value is not in the first range. When the difference between the input current value of the second charger 404 and the initially requested current value is not in the first range, the processor 406 may determine whether to request a current change or a voltage change from the adapter 410.

When the difference between the input current value of the second charger 404 and the initially requested current value is not in the first range, the processor 406 may determine whether a voltage change condition for the adapter 410 is met. When the voltage change condition is not met, the processor 406 may request the adapter 410 for the current change through the first circuit 405. This will be described in detail below with reference to FIG. 7.

When the difference between the input current value of the second charger 404 and the initially requested current value is not in the first range, the processor 406 may determine whether a current change condition for the adapter 410 is met. When the current change condition is not met, the processor 406 may request the adapter 410 for the voltage change through the first circuit 405. This will be described in detail below with reference to FIG. 11.

Figure 5A:
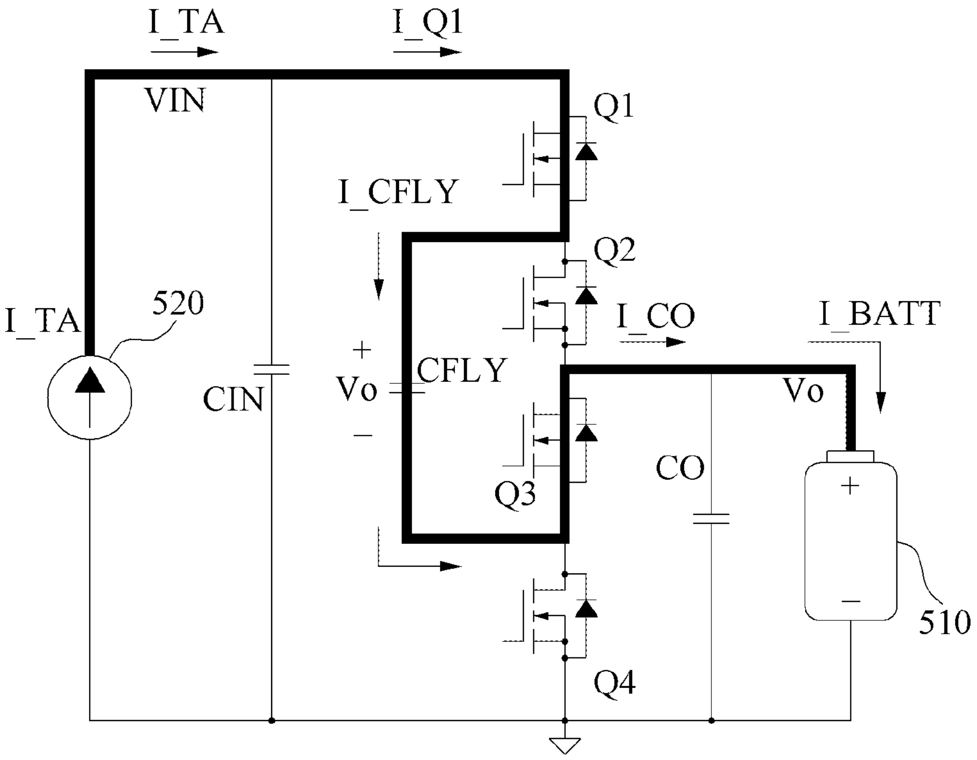
FIGS. 5A and 5B are circuit diagrams illustrating an example configuration of a second charger in an electronic device according to various embodiments.
Figure 5B:
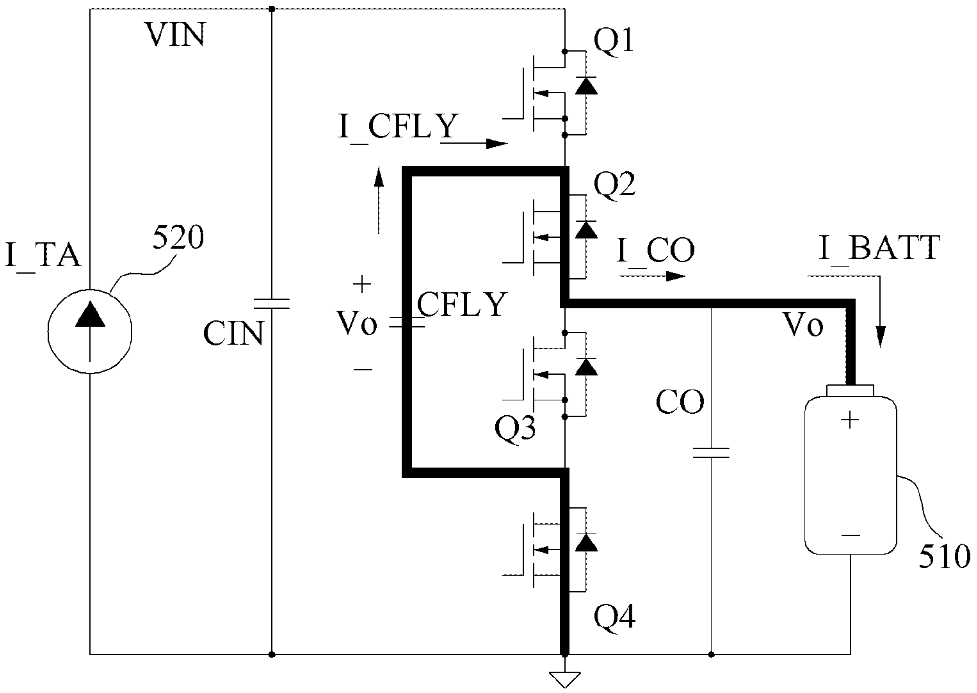

FIGS. 5A and 5B are circuit diagrams illustrating an example configuration of a second charger in an electronic device according to various embodiments.

According to various embodiments, the second charger 404 may include a 2:1 SCVD.

Referring to FIGS. 5A and 5B, the second charger 404 may include a plurality of switches Q1, Q2, Q3, and Q4, and a capacitor (e.g., a flying capacitor) CFLY.

For example, as illustrated in FIG. 5A, the processor 406 may simultaneously turn on the switches Q1 and Q3 and simultaneously turn off the switches Q2 and Q4, according to a 50% duty cycle. When the switches Q1 and Q3 are simultaneously turned on and the switches Q2 and Q4 are simultaneously turned off, the flying capacitor CFLY may be connected in series to a battery 510 (e.g., the battery 189 of FIG. 1 and the battery 408 of FIG. 4). To each of the flying capacitor CFLY and the battery 510, a ½ voltage of a voltage VIN supplied from an adapter 520 (e.g., the adapter 310 of FIG. 3 and the adapter 410 of FIG. 4) may be applied, and the flying capacitor CFLY and the battery 510 may thereby be charged.

For example, as illustrated in FIG. 5B, the processor 406 may simultaneously turn off the switches Q1 and Q3 and simultaneously turn on the switches Q2 and Q4. In this example, the charged flying capacitor CFLY may be a source of power supply of the battery 510. A current I_CFLY of the charged flying capacitor CFLY may flow toward the battery 510, and a current I_BATT may be supplied to the battery 510 to allow the battery 510 to be charged thereby.

Through the operations described above with reference to FIGS. 5A and 5B A, a voltage Vo to be applied to the battery 510 may be half the voltage VIN supplied from the adapter 520, and the current I_BATT to be supplied to the battery 510 may be double a current LTA supplied from the adapter 520.

Figure 6:
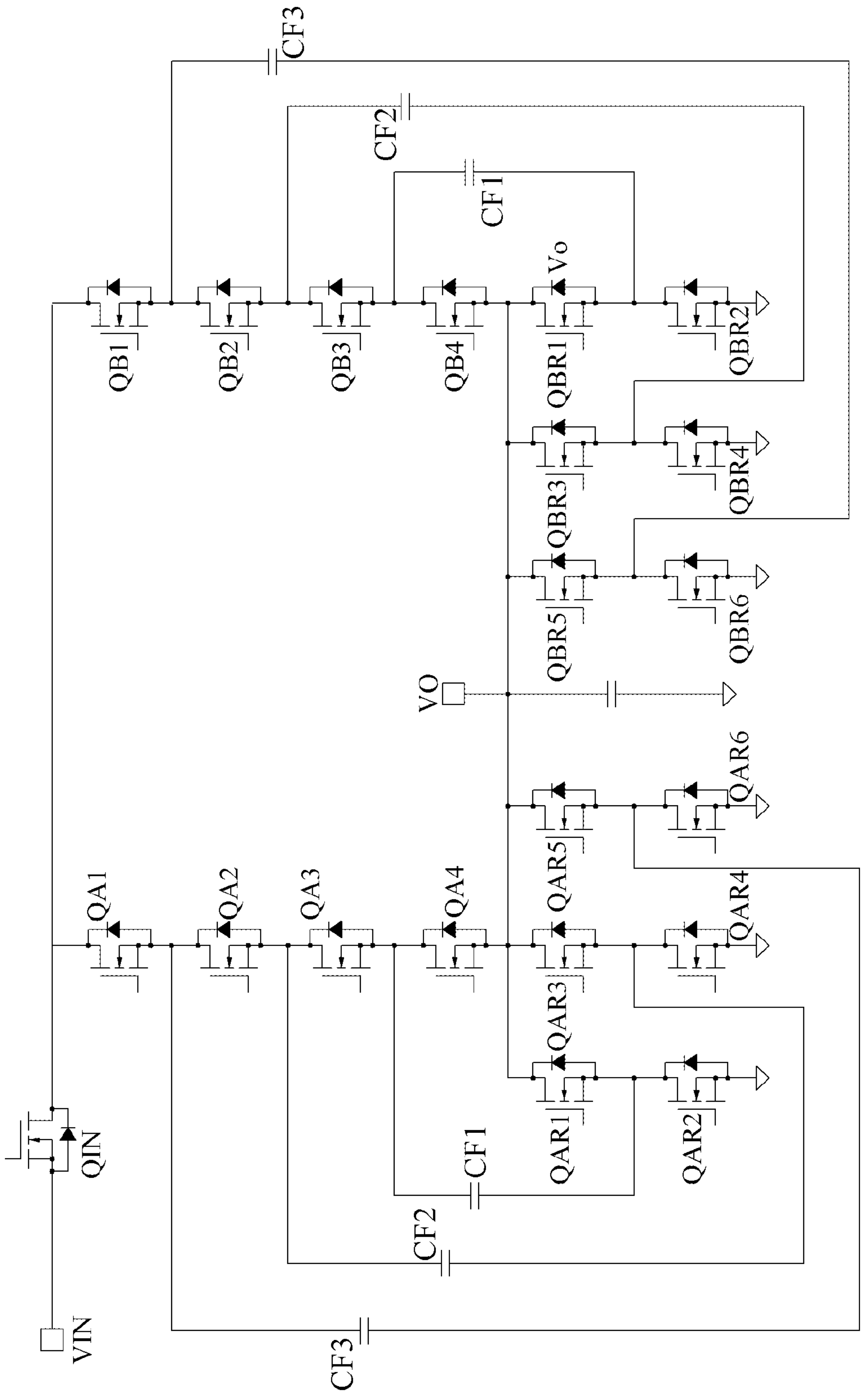
FIG. 6 is a circuit diagram illustrating an example configuration of a second charger in an electronic device according to various embodiments.

FIG. 6 is a circuit diagram illustrating an example configuration of a second charger in an electronic device according to various embodiments.

Referring to FIG. 6, the second charger 404 may include a plurality of switches QA1 through QA4, QAR1 through QAR6, QB1 through QB4, and QBR1 through QBR6, and a plurality of capacitors CF1 through CF3.

For example, as illustrated in FIG. 6, the processor 406 may control at least one of the switches (e.g., QA1 through QA4, QAR1 through QAR6, QB1 through QB4, and QBR1 through QBR6) to be turned on or off to allow the second charger 404 to perform n:1 voltage division.

Figure 7:
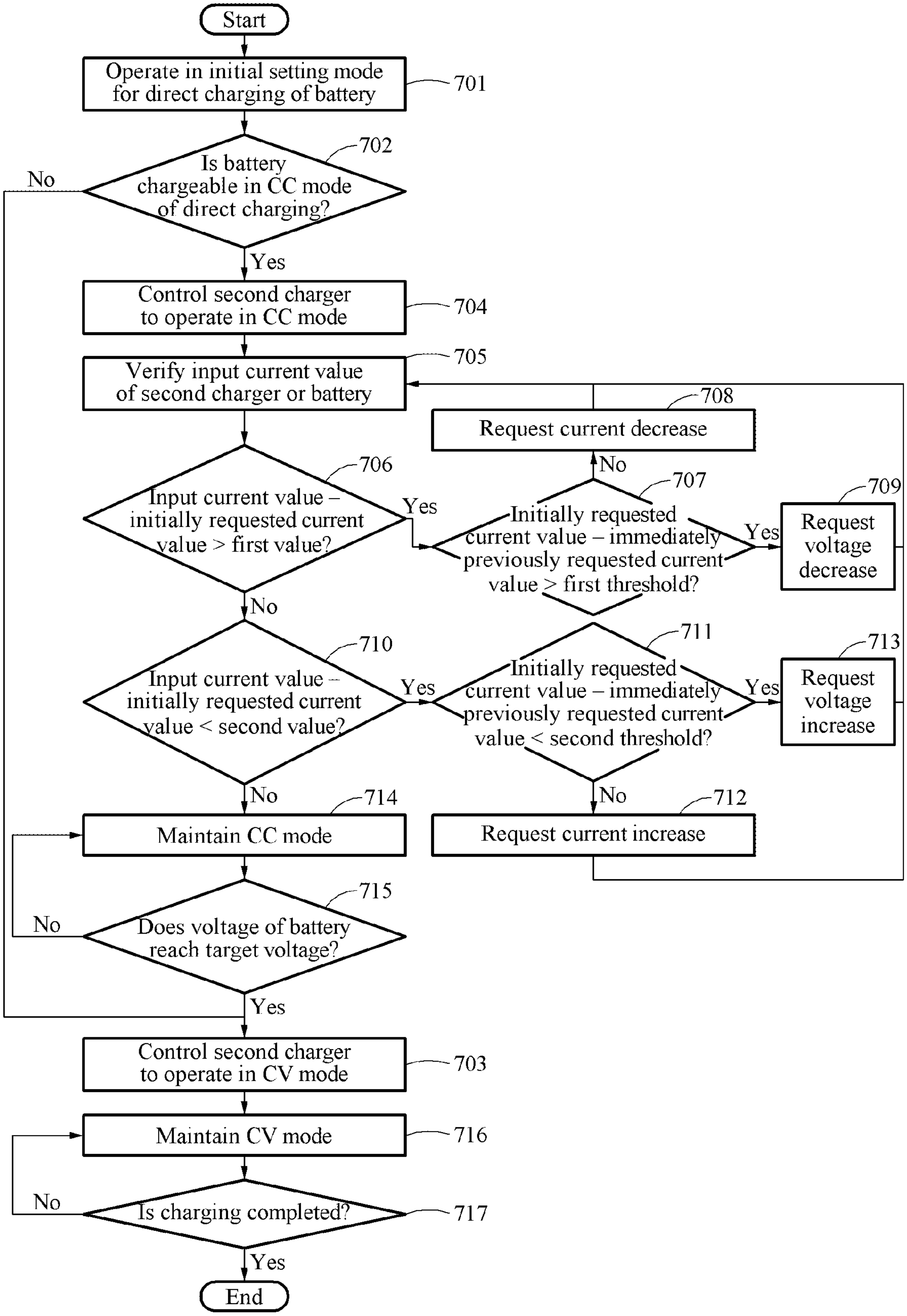
FIG. 7 is a flowchart illustrating an example method of charging an electronic device according to various embodiments.

FIG. 7 is a flowchart illustrating an example method of charging an electronic device according to various embodiments.

Referring to FIG. 7, in operation 701, the processor 406 may operate in an initial setting mode for direct charging of the battery 408. In the initial setting mode, the processor 406 may verify whether the adapter 410 supports a direct charging method, and determine or select an initial request value (e.g., an initially requested current value and/or initially requested voltage value) to be transmitted to the adapter 410 for directly charging of the battery 408 when the adapter 410 is verified to support the direct charging method.

In an example embodiment, when the adapter 410 and the connecting terminal 401 are connected, the adapter 410 may transmit adapter information to the first circuit 405. The processor 406 may receive the adapter information from the first circuit 405, and receive state information (e.g., charging state information and/or voltage information) of the battery 408 from the power gauge 407. The processor 406 may verify whether the adapter 410 supports the direct charging method based on the adapter information. When the adapter 410 support the direct charging method, the processor 406 may determine or select the initial request value based on the adapter information and/or the state information of the battery 408. For example, the processor 406 may determine the initially requested current value to be 2770 mA and the initially requested voltage value to be 9 V, but examples are not limited thereto. The processor 406 may transmit the initial request value to the adapter 410 through the first circuit 405.

In operation 702, the processor 406 may determine whether the battery 408 is chargeable in a CC mode of direct charging (or the direct charging method). In an example embodiment, when the charging state information of the battery 408 is less than a first charging threshold or the voltage state information of the battery 408 is less than a first voltage threshold, the processor 406 may determine that the battery 408 is chargeable in the CC mode of direct charging. When the charging state information of the battery 408 is greater than or equal to the first charging threshold or the voltage state information of the battery 408 is greater than or equal to the first voltage threshold, the processor 406 may determine that the battery 408 is chargeable in a CV mode of direct charging.

When the processor 406 determines that the battery 408 is not chargeable in the CC mode of direct charging (No in operation 702), the processor 406 may control the second charger 404 such that the second charger 404 operates in the CV mode in operation 703. The second charger 404 may charge the battery 408 in the CV mode, and the processor 406 may maintain the CV mode of the second charger 404 in operation 716. The second charger 404 may charge the battery 408 in the CV mode until an input current value of the battery 408 reaches a charging termination current value to be described below.

In operation 717, the processor 406 may verify whether the charging of the battery 408 is completed. A current supplied by the second charger 404 to the battery 408 in the CV mode may decrease over time. The processor 406 may receive an input current value of the battery 408 from the power sensor, and verify that the charging of the battery 408 is not completed when the input current value of the battery 408 is greater than the charging termination current value. When the charging of the battery 408 is not completed (No in operation 717), the processor 406 may maintain the CV mode of the second charger 404 in operation 716. When the input current value of the battery 408 reaches the charging termination current value, the processor 406 may verify that the charging of the battery 408 is completed or the battery 408 is fully charged (Yes in operation 717).

When determining that the battery 408 is chargeable in the CC mode of direct charging in operation 702 (Yes in operation 702), the processor 406 may control the second charger 404 such that the second charger 404 operates in the CC mode in operation 704. In an example embodiment, the processor 406 may control the second charger 404 to perform voltage division (e.g., voltage division described above with reference to FIGS. 5A and 5B or FIG. 6).

The second charger 404 may receive power from the adapter 410 and charge the battery 408 using the received power. The second charger 404 may measure or monitor an input current and transmit an input current value of the second charger 404 to the processor 406. In another example embodiment, the power sensor may transmit the input current value of the battery 408 to the processor 406.

In operation 705, the processor 406 may verify the input current value of the second charger 404. Hereinafter, how the processor 406 operates using the input current value of the second charger 404 will be described in greater detail.

Request for Current Decrease and Voltage Decrease

In an example embodiment, the second charger 404 may receive, from the adapter 410, power of a current (e.g., 2900 mA) that exceeds the initially requested current value (e.g., 2770 mA) by a certain level (e.g., a first value to be described below). The second charger 404 may transmit an input current value 1 (e.g., 2900 mA) to the processor 406.

In operation 705, the processor 406 may verify the input current value 1 of the second charger 404.

In operation 706, the processor 406 may determine whether a difference between the input current value 1 (e.g., 2900 mA) of the second charger 404 and the initially requested current value (e.g., 2770 mA) is greater than the first value (e.g., 50 mA). The first value is not limited to 50 mA described above, and may be adjusted depending on a product or a state of the electronic device 400.

When the difference between the input current value 1 of the second charger 404 and the initially requested current value is greater than the first value (e.g., 50 mA) (Yes in operation 706), the processor 406 may determine whether a difference between the initially requested current value and an immediately previously requested current value is greater than a first threshold (e.g., 200 mA). Since the processor 406 transmits the initially requested current value to the adapter 410, there may not be the immediately previously requested current value. In this case, the processor 406 may determine that a condition in operation 707 is not met, and request the adapter 410 for current decrease through the first circuit 405 in operation 708. For example, the processor 406 may transmit, to the adapter 410, a requested current value 1 which is obtained by subtracting a first decrement current value (e.g., 50 mA) from the immediately previously requested current value to request the adapter 410 for the current decrease. Since the processor 406 transmits the initially requested current value to the adapter 410, there may not be the immediately previously requested current value. Thus, the processor 406 may transmit, to the adapter 410, the requested current value 1 (e.g., 2720 mA) that is obtained by subtracting the first decrement current value (e.g., 50 mA) from the initially requested current value (e.g., 2770 mA).

In another example, the second charger 404 may receive power from the adapter 410 receiving the requested current value 1, and measure or monitor an input current and transmit an input current value to the processor 406. When it is determined that the difference between the input current value of the second charger 404 and the initially requested current value (e.g., 2770 mA) is less than or equal to the first value (e.g., 50 mA) in operation 706 (No in operation 706), the processor 406 may determine that the difference between the input current value of the second charger 404 and the initially requested current value (e.g., 2770 mA) is greater than or equal to a second value (e.g., −50 mA) in operation 710 (No in operation 710). In operation 714, the processor 406 may maintain the CC mode of the second charger 404. The processor 406 may allow the battery 408 to continue to be charged with power supplied by the adapter 410 based on the requested current value 1.

In an example embodiment, current control of the adapter 410 receiving the requested current value 1 may not normally operate. In this case, the second charger 404 may receive, from the adapter 410, power for which the current control is not normally controlled. The second charger 404 may measure or monitor an input current and transmit an input current value 2 (e.g., 2910 mA) to the processor 406.

The processor 406 may determine that a difference between the input current value 2 (e.g., 2910 mA) of the second charger 404 and the initially requested current value (e.g., 2770 mA) is greater than the first value (e.g., 50 mA) in operation 706 (Yes in operation 706), and determine that a difference between the initially requested current value (e.g., 2770 mA) and the requested current value 1 (e.g., 2720 mA) which is the immediately previously requested current value is less than the first threshold (e.g., 200 mA) in operation 707 (No in operation 707). In operation 708, the processor 406 may request the adapter 410 for current decrease through the first circuit 405. The processor 406 may transmit, to the adapter 410 through the first circuit 405, a requested current value 2 (e.g., 2670 mA) obtained by subtracting the first decrement current value (e.g., 50 mA) from the requested current value 1 (e.g., 2720 mA) which is the immediately previously requested current value.

However, the current control of the adapter 410 receiving the requested current value 2 may not normally operate, and thus the second charger 404 may receive, from the adapter 410, power for which the current control is not normally performed. The second charger 404 may measure or monitor an input current and transmit an input current value 3 (e.g., 2890 mA) to the processor 406. The processor 406 may determine that a difference between the input current value 3 (e.g., 2890 mA) of the second charger 404 and the initially requested current value (e.g., 2770 mA) is greater than the first value (e.g., 50 mA) in operation 706 (Yes in operation 706), and determine that a difference between the initially requested current value (e.g., 2770 mA) and the requested current value 2 (e.g., 2670 mA) which is the initially previously requested current value is less than the first threshold (e.g., 200 mA) in operation 707 (Yes in operation 707). The processor 406 may determine that the condition in operation 706 is met and the condition in operation 707 is not met. In operation 708, the processor 406 may transmit, to the adapter 410 through the first circuit 405, a requested current value 3 (e.g., 2620 mA) obtained by subtracting the first decrement current value (e.g., 50 mA) from the requested current value 2 (e.g., 2670 mA).

Since the current control of the adapter 410 receiving the requested current value 3 may not normally operate, the second charger 404 may receive, from the adapter 410, power for which the current control is not normally performed. The second charger 404 may measure or monitor an input current and transmit an input current value 4 (e.g., 2890 mA) to the processor 406.

The processor 406 receiving the input current value 4 may determine that the condition in operation 706 is met and the condition in operation 707 is not met. In this case, in operation 708, the processor 406 may transmit, to the adapter 410 through the first circuit 405, a requested current value 4 (e.g., 2570 mA) obtained by subtracting the first decrement current value (e.g., 50 mA) from the requested current value 3 (e.g., 2620 mA).

Since the current control of the adapter 410 receiving the requested current value 4 may not normally operate, the second charger 404 may receive, from the adapter 410, power for which the current control is not normally performed. The second charger 404 may monitor an input current and transmit an input current value 5 (e.g., 2880 mA) to the processor 406.

The processor 406 receiving the input current value 5 may determine that the condition in operation 706 is met and the condition in operation 707 is not met. In this case, in operation 708, the processor 406 may transmit, to the adapter 410 through the first circuit 405, a requested current value 5 (e.g., 2520 mA) obtained by subtracting the first decrement current value (e.g., 50 mA) from the requested current value 4 (e.g., 2570 mA).

The second charger 404 may receive power form the adapter 410. The second charger 404 may monitor an input current and transmit an input current value 6 (e.g., 2880 mA) to the processor 406. The processor 406 may determine whether the condition in operation 706 is met. When the condition in operation 706 is met (Yes in operation 706), the processor 406 may determine that a difference between the initially requested current value (e.g., 2770 mA) and the requested current value 5 (e.g., 2520 mA) which is the immediately previously requested current value is greater than the first threshold (e.g., 200 mA). In this case, in operation 709, the processor 406 may request the adapter 410 for voltage decrease through the first circuit 405. In an example embodiment, the processor 406 may transmit, to the adapter 410 through the first circuit 405, a requested voltage value obtained by subtracting a first decrement voltage value from the immediately previously requested voltage value. Since the processor 406 has transmitted the initially requested voltage value to the adapter 410, the immediately previously requested voltage value may be the initially requested voltage value. For example, the processor 406 transmit, to the adapter 410 through the first circuit 405, a requested voltage value 1 (e.g., 8.98 V) obtained by subtracting the first decrement voltage value (e.g., 200 mV) from the initially requested voltage value (e.g., 9 V).

The second charger 404 may receive power from the adapter 410. The second charger 404 may measure or monitor an input current and transmit an input current value 7 (e.g., 2800 mA) to the processor 406.

The processor 406 may determine that a difference between the input current value 7 (e.g., 2800 mA) of the second charger 404 and the initially requested current value (e.g., 2770 mA) is less than the first value (e.g., 50 mA) in operation 706, and determine that the difference between the input current value 7 (e.g., 2800 mA) and the initially requested current value (e.g., 2779 mA) is greater than the second value (e.g., −50 mA) in operation 710. The processor 406 may determine that the difference between the input current value 7 of the second charger 404 and the initially requested current value is in the first range (e.g., −50 mA to 50 mA).

In operation 714, when the input current value 7 of the second charger 404 is less than the first value and greater than the second value (No in operation 706 and No in operation 710), the processor 406 may maintain the CC mode of the second charger 404. The second charger 404 may charge the battery 408 with power of which a voltage is controlled in the CC mode. The processor 406 may allow the battery 408 to continue to be charged with the power supplied by the adapter 410 based on the requested voltage value 1.

In operation 715, the processor 406 may verify whether a voltage of the battery 408 reaches a target voltage. For example, the processor 406 may receive a voltage value of the battery 408 form the power gauge 407 and verify whether the voltage of the battery 408 reaches the target voltage based on the received target value. When the voltage of the battery 408 does not reach the target voltage (No in operation 715), the processor 406 may maintain the CC mode of the second charger 404 in operation 714. The processor 406 may maintain the CC mode of the second charger 404 until the voltage of the battery 408 reaches the target voltage.

When the voltage of the battery 408 reaches the target voltage (Yes in operation 715), the processor 406 may control the second charger 404 such that the second charger 404 operates in the CV mode in operation 703. The second charger 404 may charge the battery 408 in the CV mode. In operation 716, the processor 406 may maintain the CV mode of the second charger 404 while the battery 408 is being charged. The second charger 404 may charge the battery 408 in the CV mode until an input current value of the battery 408 reaches a charging termination current value.

In operation 717, the processor 406 may verify whether the charging of the battery 408 is completed while the battery 408 is being charged. In an example embodiment, the processor 406 may receive an input current value of the battery 408 from the power sensor, and verify that the charging of the battery 408 is not completed (No in operation 717) when the input current value of the battery 408 is greater than the charging termination current value and may maintain the CV mode of the second charger 404 in operation 716. When the input current value of the battery 408 reaches the charging termination current value, the processor 406 may verify that the charging of the battery 408 is completed or the battery 408 is fully charged (Yes in operation 717).

In an example embodiment, for the request for current decrease and the request for voltage decrease that is described above with reference to FIG. 7, the processor 406 may use an input current value of the second charger 404 in operations 705 and 706. In another example embodiment, the processor 406 may use an input current value of the battery 408 instead of the input current value of the second charger 404 in operations 705 and 706. For example, the processor 406 may receive an input current value of the battery 408 from the power sensor in the power gauge 407 and verify the input current value of the battery 408 in operation 705. The processor 406 may determine whether a difference between the input current value of the battery 408 and an initially requested current value is greater than a first value in operation 706. When the difference between the input current value of the battery 408 and the initially requested current value is greater than the first value (Yes in operation 706), the processor 406 may determine whether a condition in operation 707 is met. The processor 406 may request the adapter 410 for current decrease in operation 708 when the condition in operation 707 is not met (No in operation 707), and request the adapter 410 for voltage decrease in operation 709 when the condition in operation 707 is met (Yes in operation 707).

Request for Current Increase and Voltage Increase

In an example embodiment, the processor 406 may transmit an initially requested current value to the adapter 701 in operation 701, and the second charger 404 may receive, from the adapter 410, power of which a current that is less than the initially requested current value by a certain level (e.g., a second value to be described below). The second charger 404 may measure or monitor the current of the received power and transmit an input current value to the processor 406.

The processor 406 may verify the input current value of the second charger 404 in operation 705, and determine whether a difference between the input current value of the second charger 404 and the initially requested current value is greater than a first value in operation 706. When the difference between the input current value of the second charger 404 and the initially requested current value is less than or equal to the first value (No in operation 706), the processor 406 may determine whether the difference between the input current value of the second charger 404 and the initially requested current value is less than the second value in operation 710.

When the difference between the input current value of the second charger 404 and the initially requested current value is less than the second value (Yes in operation 710), the processor 406 may determine whether a difference between the initially requested current value and an immediately previously requested current value is less than a second threshold (e.g., −200 mA) in operation 711. When the processor 406 has transmitted the initially requested current value to the adapter 410, there may not be the immediately previously requested current value, and the processor 406 may thus determine that the condition in operation 711 is not met. When the condition in operation 711 is not met, the processor 406 may request the adapter 410 for current increase in operation 712. When the processor 406 has transmitted the initially requested current value to the adapter 410, there may not be the immediately previously requested current value, and the processor 406 may thus transmit, to the adapter 410, a requested current value obtained by adding a first increment current value (e.g., 50 mA) to the initially requested current value.

However, the adapter 410 receiving the request for current increase may not normally control an increase in the supplied current, and the second charger 404 may receive, from the adapter 410, power of which a current is less than the initially requested current value by a certain level. The processor 406 may repeat operations 705, 706, 710, 711, and 712.

After the repetition of operations 705, 706, 710, 711, and 712, the second charger 404 may receive power from the adapter 410. The second charger 404 may measure or monitor an input current and transmit an input current value to the processor 406.

When the condition in operation 706 is not met (No in operation 706), the condition in operation 710 is met (Yes in operation 710), and the condition in operation 711 is met (Yes in operation 711), the processor 406 may request the adapter 410 for voltage increase through the first circuit 405 in operation 713. For example, the processor 406 may transmit, to the adapter 410, a requested voltage value obtained by adding a first increment voltage value (e.g., 20 mA) to an immediately previously requested voltage value. Since the processor 406 has transmitted the initially requested voltage value to the adapter 410, the immediately previously requested voltage value may be the initially requested voltage value. For example, the processor 406 may transmit, to the adapter 410, the requested voltage value (e.g., 9.02 V) obtained by adding the first increment voltage value (e.g., 20 mV) to the initially requested voltage value (e.g., 9 V).

The adapter 910 receiving the requested voltage value (e.g., 9.02 V) may supply, to the second charger 404, power of which a voltage is controlled, and the second charger 404 may monitor an input current and transmit an input current value to the processor 406. When the condition in operation 706 is not met (No in operation 706), the condition in operation 710 is met (Yes in operation 710), and the condition in operation 711 is met (Yes in operation 711), the processor 406 may request again the adapter 410 for voltage increase in operation 713. For example, the processor 406 may transmit, to the adapter 410, a requested voltage value (e.g., 9.04 V) obtained by adding the first increment voltage value (e.g., 20 mV) to the immediately previously requested voltage value (e.g., 9.02 V). When the condition in operation 706 is not met (No in operation 706) and the condition in operation 710 is not met (No in operation 710), the processor 406 may maintain the CC mode of the second charger 404 in operation 714. The second charger 404 may charge the battery 408 with the power of which the voltage is controlled in the CC mode. The processor 406 may allow the battery 408 to continue to be charged with power of the adapter 410 supplied based on the requested voltage value (e.g., 9.02 V).

In operation 715, the processor 406 may verify whether a voltage of the battery 408 reaches a target voltage. When the voltage of the battery 408 does not reach the target voltage (No in operation 715), the processor 406 may maintain the CC mode of the second charger 404 in operation 714. When the voltage of the battery 408 reaches the target voltage (Yes in operation 715), the processor 406 may control the second charger 404 such that the second charger 404 operates in the CV mode in operation 703. The second charger 404 may charge the battery 408 in the CV mode, and the processor 406 may maintain the CV mode of the second charger 404 in operation 716.

In operation 717, the processor 406 may verify whether the charging of the battery 408 is completed. When an input current value of the battery 408 is less than a charging termination current value, the processor 406 may verify that the charging of the battery 408 is not completed (No in operation 717), and maintain the CV mode of the second charger 404 in operation 716. When the input current value of the battery 408 reaches the charging termination current value, the processor 406 may verify that the charging of the battery 408 is completed or the battery 408 is fully charged (Yes in operation 717).

In an example embodiment, for the request for current increase and the request for voltage increase that is described above with reference to FIG. 7, the processor 406 may use an input current value of the second charger 404 in operations 705, 706, and 710. In another example embodiment, the processor 406 may use an input current value of the battery 408 instead of the input current value of the second charger 404 in operations 705, 706, and 710. For example, the processor 406 may receive an input current value of the battery 408 from the power sensor in the power gauge 407 and verify the input current value of the battery 408 in operation 705. The processor 406 may determine whether a difference between the input current value of the battery 408 and an initially requested current value is greater than a first value in operation 706. When the difference between the input current value of the battery 408 and the initially requested current value is less than or equal to the first value (No in operation 706), the processor 406 may determine whether the difference between the input current value of the battery 408 and the initially requested current value is less than a second value in operation 710. When the difference between the input current value of the battery 408 and the initially requested current value is less than the second value (No in operation 710), the processor 406 may determine whether the condition in operation 711 is met. When the condition in operation 711 is not met (No in operation 711), the processor 406 may request the adapter 410 for current increase in operation 712. When the condition in operation 711 is met (Yes in operation 711), the processor 406 may request the adapter 410 for voltage increase in operation 713.

The example embodiments described above with reference to FIGS. 1 through 6 may be applicable to the example embodiments described with reference to FIG. 7.

FIG. 8 is a diagram illustrating example adapter information according to various embodiments.

According to various example embodiments, adapter information may include source capability information 810, 820, 830, 840, 850 and 860 of the adapter 410.

Each set of the source capability information 810 through 860 may include a power data object (PDO) type and information associated with a voltage and current supported by the adapter 410. The PDO type may include a fixed PDO and an augmented PDO (APDO). The fixed PDO may indicate that a supportable voltage of the adapter 410 is fixed, and the APDO may indicate that the supportable voltage of the adapter 410 is variable.

The PPS described above may correspond to the APDO described with reference to FIG. 8.

For example, when electrically connected to the electronic device 400, the adapter 410 may transmit the adapter information (e.g., the source capability information 810 through 850 of FIG. 8) to the first circuit 405. The processor 406 may receive the adapter information from the first circuit 405 and verify whether the adapter 410 supports direct charging using the adapter information. For example, the processor 406 may verify that the adapter 410 supports the APDO from the PDO type of the source capability information 860, and verify that the adapter 410 supports a minimum voltage (e.g., 9 V) of direct charging from a supportable voltage range (e.g., 3.3 V to 21.00 V) of the adapter 410. The processor 406 may verify that the adapter 410 is capable of supporting the APDO and the minimum voltage of direct charging and may thus determine that the adapter 410 is capable of direct charging.

When the adapter 410 supports direct charging, the processor 406 may determine an initially requested current value and an initially requested voltage value based on the source capability information 860 and/or state information of the battery 408. For example, the processor 406 may determine, to be 9 V, the initially requested voltage value in the supportable voltage range (e.g., 3.3 V to 21.00 V) of the adapter 410 using the state information of the battery 408, and determine the initially requested current value to be 2.77 A which is less than a maximum current because the adapter 410 may support the maximum current which is 3.00 A.

The processor 406 may then allow the second charger 404 that supports direct charging, of the first charger 403 and the second charger 404, to charge the battery 408.

Figure 9:
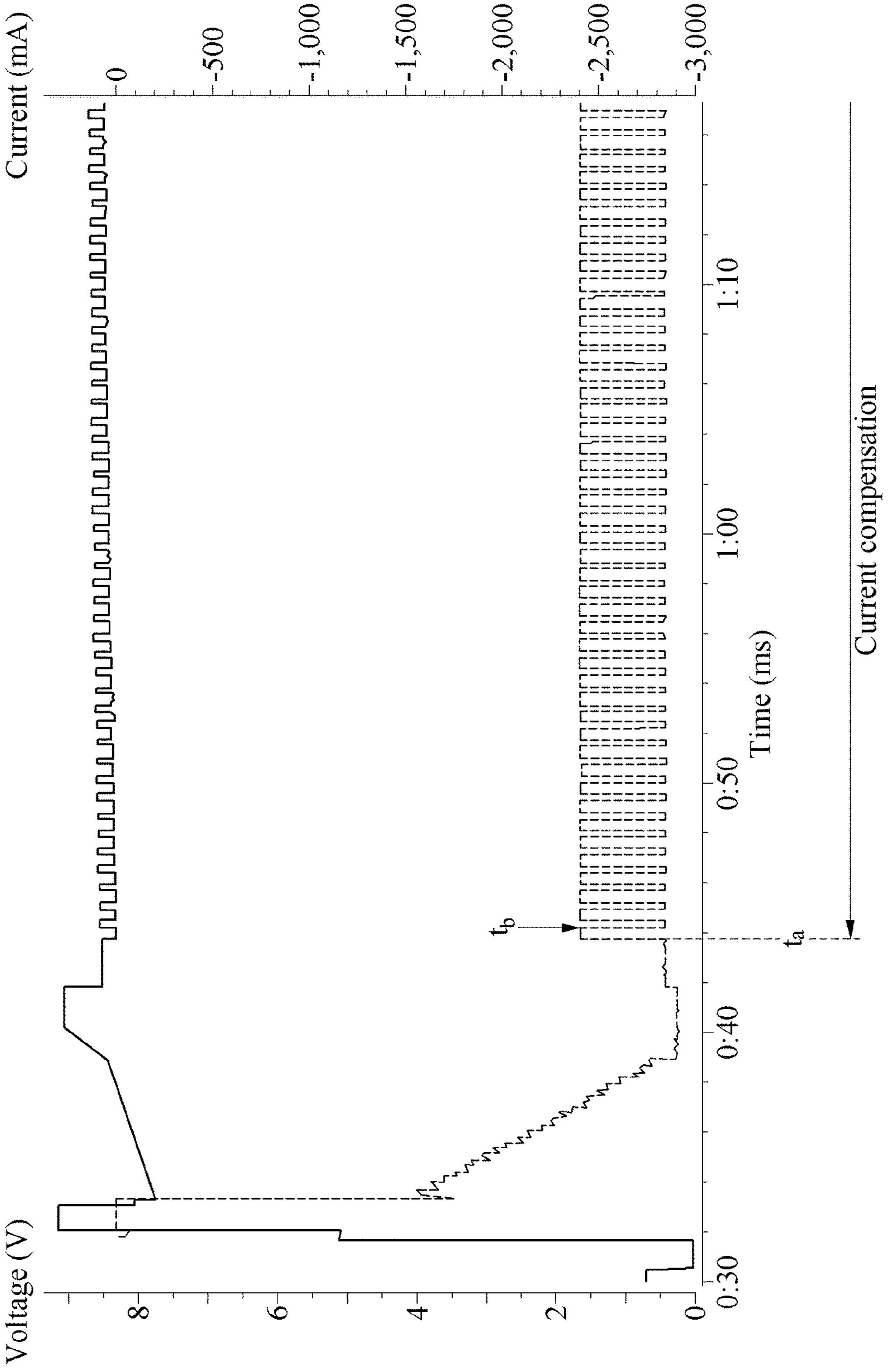
(RELATED ART) FIG.9
FIG. 9 is a diagram illustrating an example charging profile in charging a battery through an existing direct charging method.
Figure 10:
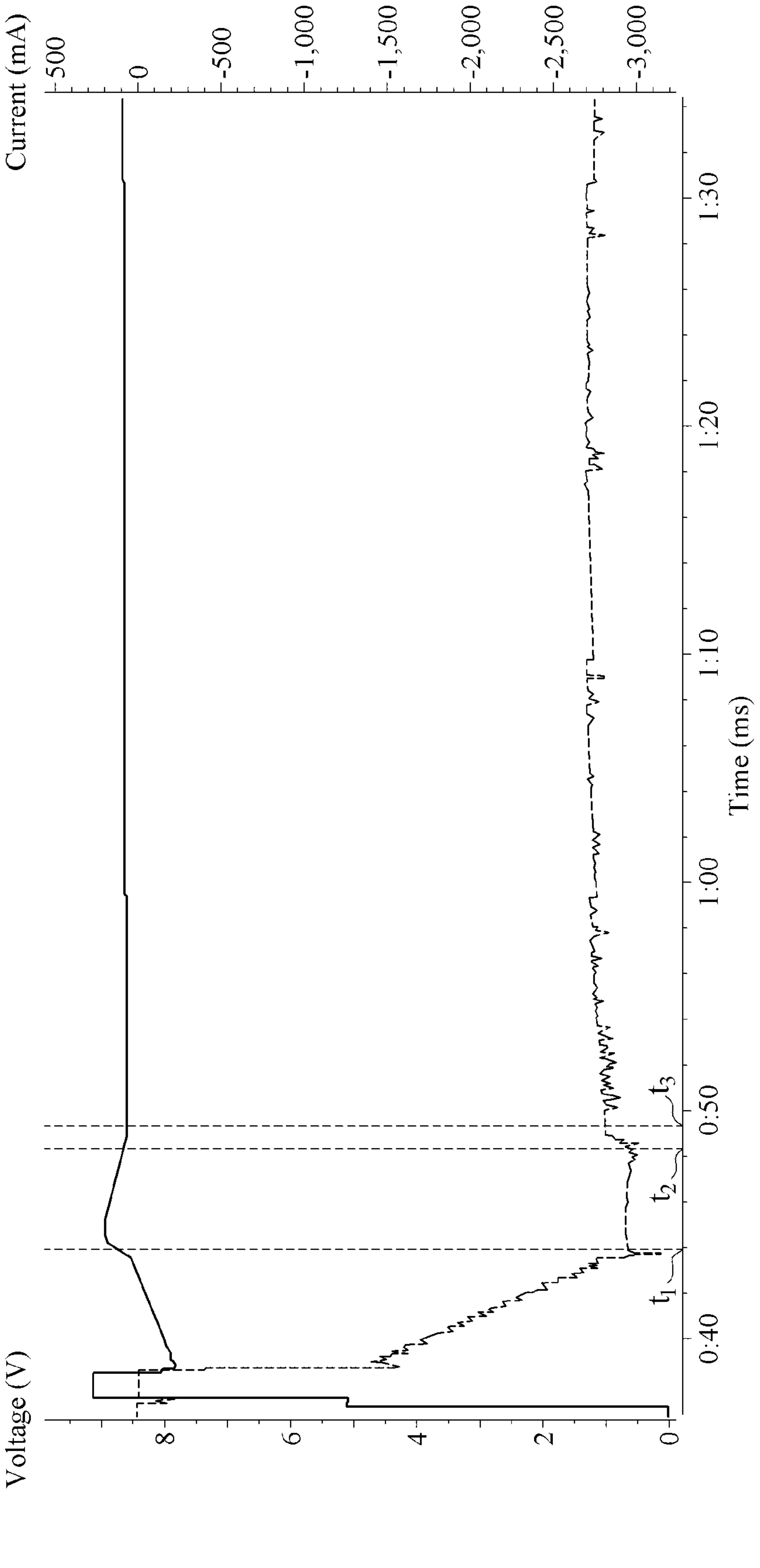
FIG. 10 is a diagram illustrating an example charging profile in charging a battery through the charging method illustrated in FIG. 7 according to various embodiments.

FIG. 9 is a diagram illustrating an example charging profile in charging a battery through an existing direct charging method. FIG. 10 is a diagram illustrating an example charging profile in charging a battery through the charging method described above with reference to FIG. 7 according to various embodiments.

FIG. 9 is a graph indicating a supplied current and a supplied voltage of the adapter 410 according to an existing direct charging method.

Referring to FIG. 9, the existing direct charging method may request the adapter 410 for a first current (e.g., 2000 mA) at a time $t_a$. For example, a current response of the adapter 410 may be abnormal, and the supplied current of the adapter 410 may be approximately 2400 mA which is greater than the requested first current.

In this example, the existing direct charging method may perform current compensation such that the supplied current of the adapter 410 is in a valid range. As illustrated in FIG. 9, for the current compensation, the existing direct charging method may request the adapter 410 for a second current (e.g., 2050 mA) at a time $t_b$. For example, a current response of the adapter 410 may be abnormal, and the supplied current of the adapter 410 may increase to approximately 2800 mA. Since the supplied current of the adapter 410 is not in the valid range, the existing direct charging method may perform the current compensation repeatedly as illustrated in FIG. 9.

FIG. 10 is a graph indicating a supplied current and a supplied voltage of the adapter 410 according to the charging method described above with reference to FIG. 7 according to various embodiments. As illustrated in the graph of FIG. 10, there may be no interval for the current compensation shown in FIG. 9.

Referring to FIG. 10, although the processor 406 requests the adapter 410 for current decrease for an interval before a time $t_1$, the supplied current of the adapter 410 may increase due to an abnormal current response of the adapter 410.

In this case, as the condition in operation 706 (an input current value of the second charger 404–an initially requested current value>a first value) and the condition in operation 707 (the initially requested current value–an immediately previously requested current value>a first threshold) of FIG. 7 are met at the time $t_1$, the processor 406 may request the adapter 410 for voltage decrease.

As the condition in operation 706 and the condition in operation 707 of FIG. 7 are met during an interval between the time $t_1$ and a time $t_2$, the processor 406 may continuously request the adapter 410 for voltage decrease.

When the processor 406 requests the adapter 410 for voltage decrease at the time $t_2$, the supplied current of the adapter 410 may start to decrease.

The processor 406 may request voltage decrease at a time $t_3$, and the supplied current of the adapter 410 may become in the valid range since the time $t_3$.

The processor 406 may not perform the current compensation in response to the abnormal current response of the adapter 410, thereby improving charging efficiency.

Figure 11:
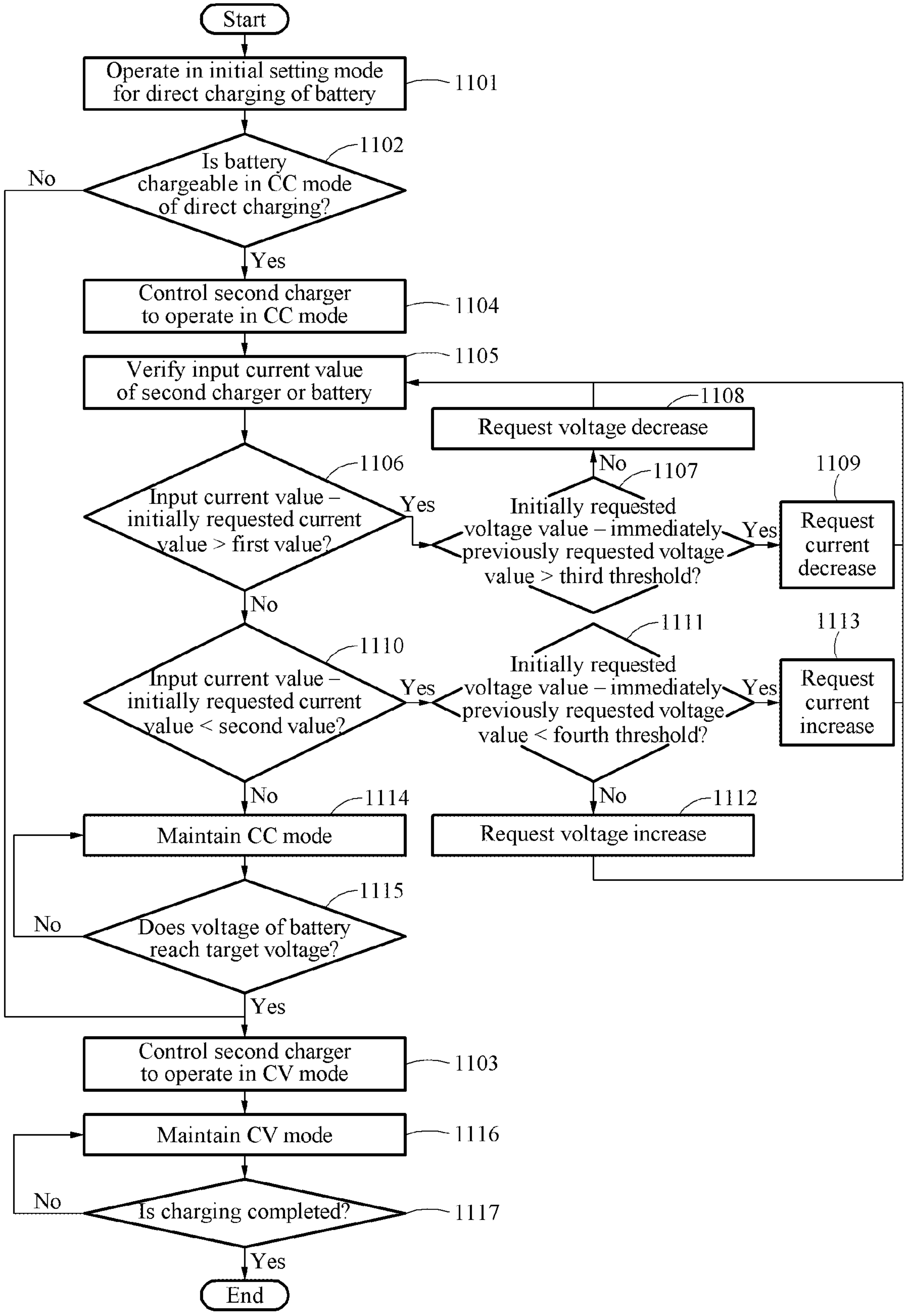
FIG. 11 is a flowchart illustrating an example method of charging an electronic device according to various embodiments.

FIG. 11 is a flowchart illustrating an example method of charging an electronic device according to various embodiments.

Referring to FIG. 11, in operation 1101, the processor 406 may operate in an initial setting mode for direct charging of the battery 408. In an example embodiment, the processor 406 may determine an initial request value (e.g., an initially requested current value and/or initially requested voltage value) based on adapter information and/or state information of the battery 408, and transmit the initial request value to the adapter 410.

In operation 1102, the processor 406 may determine whether the battery 408 is chargeable in a CC mode of direct charging (or a direct charging method).

When the processor 406 determines that the battery 408 is not chargeable in the CC mode of direct charging in operation 1102 (No in operation 1102), the processor 406 may control the second charger 404 such that the second charger 404 operates in a CV mode of direct charging in operation 1103. The second charger 404 may charge the battery 408 in the CV mode, and the processor 406 may maintain the CV mode of the second charger 404 while the battery 408 is being charged in operation 1116. The second charger 404 may charge the battery 408 in the CV mode until an input current value of the battery 408 reaches a charging termination current value.

In operation 1117, the processor 406 may verify whether the charging of the battery 408 is completed. When the input current value of the battery 408 is greater than the charging termination current value, the processor 406 may verify that the charging of the battery 408 is not completed in operation 1117 (No in operation 1117), and maintain the CV mode of the second charger 404 in operation 1116. When the input current value of the battery 408 reaches the charging termination current value, the processor 406 may verify that the charging of the battery 408 is completed or the battery 408 is fully charged in operation 1117 (Yes in operation 1117).

When the processor 406 determines that the battery 408 is chargeable in the CC mode of direct charging in operation 1102 (Yes in operation 1102), the processor 406 may control the second charger 404 such that the second charger 404 operates in the CC mode in operation 1104.

The foregoing descriptions of operations 701 through 704 provided with reference to FIG. 7 may be applicable to operations 1101 through 1104, respectively, and thus more detailed and repeated descriptions of operations 1101 through 1104 will be omitted here for brevity.

Request for Voltage Decrease and Current Decrease

In an example embodiment, the second charger 404 may receive, from the adapter 410, power of a current exceeding an initially requested current value by a certain level (e.g., a first value to be described below). The second charger 404 may measure or monitor the current of the received power and transmit an input current value to the processor 406.

In operation 1105, the processor 406 may verify the input current value of the second charger 404.

In operation 1106, the processor 406 may determine whether a difference between the input current value of the second charger 404 and the initially requested current value is greater than the first value.

When the difference between the input current value of the second charger 404 and the initially requested current value is greater than the first value in operation 1106 (Yes in operation 1106), the processor 406 may determine whether a difference between an initially requested voltage value and an immediately previously requested voltage value is greater than a third threshold in operation 1107. When the processor 406 transmits the initially requested voltage value to the adapter 410, there may not be the immediately previously requested voltage value. In this case, the processor 406 may determine that a condition in operation 1107 is not met (No in operation 1107), and may request the adapter 410 for voltage decrease in operation 1108. For example, the processor 406 may transmit, to the adapter 410, a requested voltage value obtained by subtracting a first decrement voltage value (e.g., 20 mV) from the initially requested voltage value.

In another example embodiment, the second charger 404 may receive power from the adapter 410 receiving the requested voltage value, and measure or monitor an input current to transmit an input current value to the processor 406. The processor 406 may determine that the difference between the input current value of the second charger 404 and the initially requested current value is less than or equal to the first value (e.g., 50 mA) in operation 1106 (No in operation 1106), and determine that the difference between the input current value of the second charger 404 and the initially requested current value is greater than or equal to the second value (e.g., −50 mA) in operation 1110 (No in operation 1110). In operation 1114, the processor 406 may maintain the CC mode of the second charger 404. The processor 406 may allow the battery 408 to continue to be charged with power supplied by the adapter 410 based on the requested voltage value.

The adapter 410 receiving the request for voltage decrease may not normally perform control for decreasing a supplied voltage, and the second charger 404 may thus receive power of which a voltage is not decreased from the adapter 410 and the processor 406 may repeat operations 1105, 1106, 1107, and 1108.

After the repetition of operations 1105, 1106, 1107, and 1108, the second charger 404 may receive power from the adapter 410, and measure or monitor an input current to transmit an input current value to the processor 406.

When the condition in operation 1106 is met (Yes in operation 1106) and the condition in operation 1107 is met (Yes in operation 1107), the processor 406 may request the adapter 410 for current decrease through the first circuit 405. For example, the processor 406 may transmit, to the adapter 410, a requested current value obtained by subtracting the first decrement current value (e.g., 50 mA) from the immediately previously requested current value. When the processor 406 transmits the initially requested current value to the adapter 410, the immediately previously requested current value may correspond to the initially requested current value. The processor 406 may transmit, to the adapter 410, the requested current value (e.g., 2720 mA) obtained by subtracting the first decrement current value (e.g., 50 mA) from the initially requested current value (e.g., 2770 mA).

The adapter 410 receiving the requested current value (e.g., 2720 mA) may supply, to the second charger 404, power of which a current is controlled, and the second charger 404 may measure or monitor an input current to transmit an input current value to the processor 406. When the condition in operation 1106 and the condition in operation 1107 are met, the processor 406 may request again the adapter 410 for current decrease in operation 1109. For example, the processor 406 may transmit, to the adapter 410, a requested current value (e.g., 2670 mA) obtained by subtracting the first decrement current value (e.g., 50 mA) from the immediately previously requested current value (e.g., 2720 mA). When the condition in operation 1106 is not met (No in operation 1106) and the condition in operation 1110 is not met (No in operation 1110), the processor 406 may maintain the CC mode of the second charger 404 in operation 714. The second charger 404 may charge the battery 408 with power of which a current is controlled in the CC mode.

In operation 1115, the processor 406 may verify whether a voltage of the battery 408 reaches a target voltage while the battery 408 is being charged. When the voltage of the battery 408 does not reach the target voltage in operation 1115 (No in operation 1115), the processor 406 may maintain the CC mode of the second charger 404 in operation 1114. When the voltage of the battery 408 reaches the target voltage in operation 1115 (Yes in operation 1115), the processor 406 may control the second charger 404 such that the second charger 404 operates in the CV mode in operation 1103. In operation 1116, the processor 406 may maintain the CV mode of the second charger 404 during the charging of the battery 408. The second charger 404 may charge the battery 408 in the CV mode until the input current value of the battery 408 reaches a charging termination current value.

In operation 1117, the processor 406 may verify whether the charging of the battery 408 is completed. When the input current value of the battery 408 is greater than the charging termination current value, the processor 406 may verify that the charging of the battery 408 is not completed in operation 1117 (No in operation 1117), and maintain the CV mode of the second charger 404 in operation 1116. When the input current value of the battery 408 reaches the charging termination current value, the processor 406 may verify that the charging of the battery 408 is completed or the battery 408 is fully charged in operation 1117 (Yes in operation 1117).

In an example embodiment, for the request for voltage decrease and the request for current decrease described above with reference to FIG. 11, the processor 406 may use an input current value of the second charger 404 in operations 1105 and 1106. In another example embodiment, the processor 406 may use an input current value of the battery 408 instead of the input current value of the second charger 404 in operations 1105 and 1106. For example, the processor 406 may receive the input current value of the battery 408 from the power sensor in the power gauge 407, and verify an input current value of the battery 408. In operation 1106, the processor 406 may determine whether a difference between the input current value of the battery 408 and an initially requested current value is greater than the first value. When the difference between the input current value of the battery 408 and the initially requested current value is greater than the first value in operation 1106 (Yes in operation 1106), the processor 406 may determine whether the condition in operation 1107 is met. When the condition in operation 1107 is not met (No in operation 1107), the processor 406 may request the adapter 410 for voltage decrease in operation 1108. When the condition in operation 1107 is met (Yes in operation 1107), the processor 406 may request the adapter 410 for current decrease in operation 1109.

Request for Current Increase and Voltage Increase

In an example embodiment, the processor 406 may transmit an initially requested current value to the adapter 410 in operation 1101, and the second charger 404 may receive, from the adapter 410, power of a current that is less than the initially requested current value by a certain level (e.g., a second value to be described below). The second charger 404 may measure or monitor the current of the received power and transmit an input current value to the processor 406.

The processor 406 may verify the input current value of the second charger 404 in operation 1105, and determine whether a difference between the input current value of the second charger 404 and the initially requested current value is greater than the first value in operation 1106. When the difference between the input current value of the second charger 404 and the initially requested current value is less than or equal to the first value in operation 1106 (No in operation 1106), the processor 406 may determine whether the difference between the input current value of the second charger 404 and the initially requested current value is less than the second value in operation 1110.

When the difference between the input current value of the second charger 404 and the initially requested current value is less than the second value (Yes in operation 1110), the processor 406 may determine whether a difference between an initially requested voltage value and an immediately previously requested voltage value is less than a fourth threshold in operation 1111. When the processor 406 transmits the initially requested voltage value to the adapter 410, there may not be the immediately previously requested voltage value, and thus the processor 406 may determine that a condition in operation 1111 is not met. When the condition in operation 1111 is not met, the processor 406 may request the adapter 410 for voltage increase in operation 1112. When the processor 406 transmits the initially requested voltage value to the adapter 410, there may not be the immediately previously requested voltage value, and thus the processor 406 may transmit, to the adapter 410, a requested voltage value obtained by adding a first increment voltage value (e.g., 20 mV) to the initially requested voltage value.

However, the adapter 410 receiving the request for voltage increase may not normally perform control for increasing a supplied voltage, and thus the second charger 404 may receive, from the adapter 410, power of a current that is less than the initially requested current value by a certain level, and the processor 406 may repeat operations 1105, 1106, 1110, 1111, and 1112.

After the repetition of operations 1105, 1106, 1110, 1111, and 1112, the second charger 404 may receive power from the adapter 410. The second charger 404 may measure or monitor an input current and transmit an input current value to the processor 406.

When the condition in operation 1106 is not met (No in operation 1106), the condition in operation 1110 is met (Yes in operation 1110), and the condition in operation 1111 is met (Yes in operation 1111), the processor 406 may request the adapter 410 for current increase through the first circuit 405 in operation 1113. For example, the processor 406 may transmit, to the adapter 410, a requested current value obtained by adding the first increment current value (e.g., 50 mA) to the immediately previously requested current value. Since the processor 406 transmits the initially requested current value to the adapter 410, the immediately previously requested current value may be the initially requested current value. The processor 406 may transmit, to the adapter 410, the requested current value obtained by adding the first increment current value to the initially requested current value.

The adapter 410 receiving the requested current value may supply, to the second charger 404, power of which a current is controlled, and the second charger 404 may measure or monitor an input current and transmit an input current value to the processor 406. When the condition in operation 1106 is not met (No in operation 1106), the condition in operation 1110 is met (Yes in operation 1110), and the condition in operation 1111 is met (Yes in operation 1111), the processor 406 may request again the adapter 410 for current increase in operation 1113. When the condition in operation 1106 is not met (No in operation 1106) and the condition in operation 1110 is not met (No in operation 1110), the processor 406 may maintain the CC mode of the second charger 404 in operation 1114. The second charger 404 may charge the battery 408 with power of which a current is controlled in the CC mode.

In operation 1115, the processor 406 may verify whether a voltage of the battery 408 reaches a target voltage while the battery 408 is being charged. When the voltage of the battery 408 does not reach the target voltage in operation 1115 (No in operation 1115), the processor 406 may maintain the CC mode of the second charger 404 in operation 1114. When the voltage of the battery 408 reaches the target voltage in operation 1115 (Yes in operation 1115), the processor 406 may control the second charger 404 such that the second charger 404 operates in the CV mode in operation 1103. The second charger 404 may charge the battery 408 in the CV mode, and the processor 406 may maintain the CV mode of the second charger 404 while the battery 408 is being charged in operation 1116. The second charger 404 may charge the battery 408 in the CV mode until the input current value of the battery 408 reaches the charging termination current value.

In operation 1117, the processor 406 may verify whether the charging of the battery 408 is completed. When the input current value of the battery 408 is greater than the charging termination current value, the processor 406 may verify that the charging of the battery 408 is not completed (No in operation 1117), and maintain the CV mode of the second charger 404 in operation 1116. When the input current value of the battery 408 reaches the charging termination current value, the processor 406 may verify that the charging of the battery 408 is completed or the battery 408 is fully charged (Yes in operation 1117).

In an example embodiment, for the request for voltage increase and the request for current increase described above with reference to FIG. 11, the processor 406 may use an input current value of the second charger 404 in operations 1105, 1106, and 1110. In another example embodiment, the processor 406 may use an input current value of the battery 408 instead of the input current value of the second charger 404 in operations 1105, 1106, and 1110. For example, the processor 406 may receive an input current value of the battery 408 from the power sensor in the power gauge 407 in operation 1105 to verify the input current value of the battery 408. The processor 406 may determine whether a difference between the input current value of the battery 408 and an initially requested current value is greater than the first value in operation 1106. When the difference between the input current value of the battery 408 and the initially requested current value is less than or equal to the first value (No in operation 1106), the processor 406 may determine whether the difference between the input current value of the battery 408 and the initially requested current value is less than the second value in operation 1110. When the difference between the input current value of the battery 408 and the initially requested current value is less than the second value (Yes in operation 1110), the processor 406 may determine whether the condition in operation 1111 is met. When the condition in operation 1111 is not met (No in operation 1111), the processor 406 may request the adapter 410 for voltage increase in operation 1112. When the condition in operation 1111 is met (Yes in operation 1111), the processor 406 may request the adapter 410 for current increase in operation 1113.

What has been described above with reference to FIGS. 1 through 10 may be applicable to the example embodiments described above with reference to FIG. 11

Figure 12:
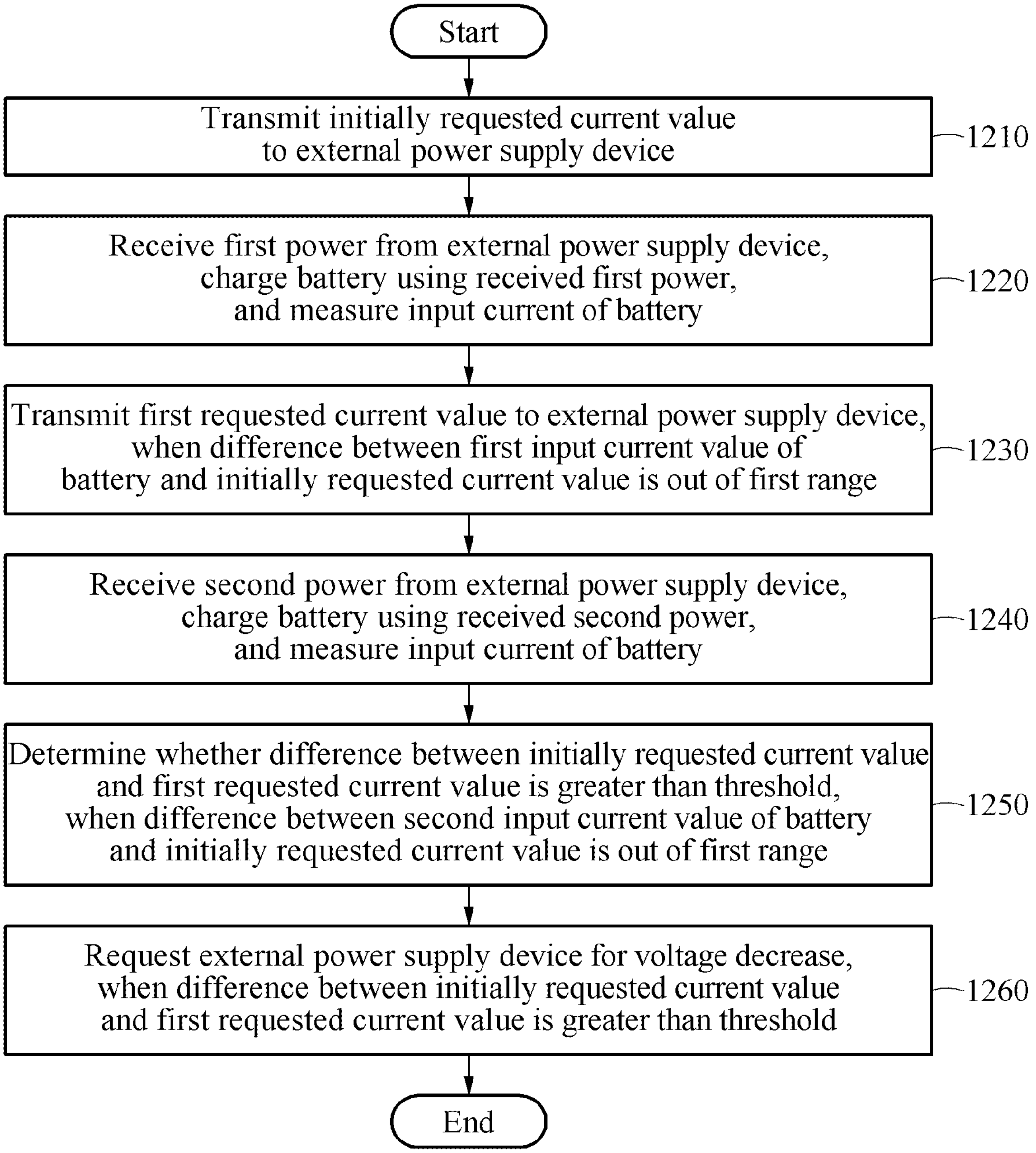
FIG. 12 is a flowchart illustrating an example method of operating an electronic device according to various embodiments.

FIG. 12 is a flowchart illustrating an example method of operating an electronic device according to various embodiments.

Referring to FIG. 12, in operation 1210, the electronic device 400 may transmit an initially requested current value to an external power supply device (e.g., the adapter 410 of FIG. 4).

In operation 1220, the electronic device 400 may receive first power from the external power supply device (e.g., the adapter 410 of FIG. 4), charge the battery 408 using the received first power, and measure an input current of the battery 408.

In operation 1230, when a difference between a first input current value of the battery 408 and the initially requested current value is out of a first range, the electronic device 400 may transmit a first requested current value to the external power supply device.

In operation 1240, the electronic device 400 may receive second power from the external power supply device, charge the battery 408 using the received second power, and measure an input current of the battery 408.

In operation 1250, when a difference between a second input current value of the battery 408 and the initially requested current value is out of the first range, the electronic device 400 may determine whether a difference between the initially requested current value and the first requested current value is greater than a threshold (e.g., the first threshold in FIG. 7).

In operation 1260, when the difference between the initially requested current value and the first requested current value is greater than the threshold (e.g., the first threshold in FIG. 7), the electronic device 400 may request the external power supply device for voltage decrease.

For a description of the method described above with reference to FIG. 12, reference may be made to what has been described above with reference to FIGS. 1 through 11 and a more detailed and repeated description thereof may not be provided here for brevity.

According to various example embodiments, an electronic device (e.g., 400) may include: a battery (e.g., 408), a first circuit (e.g., 405) configured to communicate with an external power supply device (e.g., the adapter 310 of FIG. 3 and the adapter 410 of FIG. 4), a charging circuit (e.g., the second charger 404 of FIG. 4) configured to receive power from the external power supply device and charge the battery using the received power, a power sensor configured to measure an input current of the battery, and a processor (e.g., 406) configured to: transmit an initially requested current value to the external power supply device through the first circuit, receive a first input current value of the battery from the power sensor, transmit a first requested current value to the external power supply device through the first circuit based on a difference between the first input current value and the initially requested current value being out of a first range, receive a second input current value of the battery from the power sensor, determine whether a difference between the initially requested current value and the first requested current value is greater than a threshold (e.g., the first threshold in FIG. 7) based on a difference between the second input current value and the initially requested current value being out of the first range, and request the external power supply device for voltage decrease through the first circuit based on the difference between the initially requested current value and the first requested current value being greater than the threshold (e.g., the first threshold in FIG. 7).

The processor may be configured to: transmit an initially requested voltage value along with the initially requested current value to the external power supply device through the first circuit, and transmit, to the external power supply device through the first circuit, a first requested voltage value that is less than the initially requested voltage value, based on a difference between the initially requested current value and the first requested current value being greater than the threshold (e.g., the first threshold in FIG. 7).

When the difference between the initially requested current value and the first requested current value is less than or equal to the threshold (e.g., the first threshold in FIG. 7), the processor may be configured to transmit a second requested current value that is less than the first requested current value to the external power supply device through the first circuit.

When the difference between the second input current value and the initially requested current value is in the first range, the processor may be configured to allow the battery to continue to be charged with power of the external power supply device supplied based on the first requested current value.

The electronic device may further include a power gauge (e.g., 407) configured to determine state information of the battery.

When the external power supply device and the electronic device are electrically connected, the first circuit may receive external power supply device information (e.g., adapter information in FIG. 8) from the external power supply device.

The processor may be configured to: receive the determined state information from the power gauge, receive the external power supply device information from the first circuit, and determine the initially requested current value based on the determined state information and the external power supply device information.

The processor may be configured to verify whether the external power device supports a direct charging method using the external power supply device information.

The external power supply device information may include information associated with a voltage and current that may be supported by the external power supply device, and information as to whether the external power supply device supports the direct charging method.

The processor may be configured to determine whether to allow the charging circuit (e.g., the second charger 404 of FIG. 4) to charge the battery in a constant current (CC) mode using the state information of the battery.

When charging state information of the battery is less than a charging threshold, the processor may be configured to: determine that the charging circuit (e.g., the second charger 404 of FIG. 4) is to charge the battery in the CC mode. When the charging state information of the battery is greater than or equal to the charging threshold, the processor may be configured to: determine that the charging circuit (e.g., the second charger 404 of FIG. 4) is to charge the battery in a constant voltage (CV) mode.

The external power supply device may include an adapter configured to support the direct charging method.

According to various example embodiments, an electronic device (e.g., 400) may include: a battery (e.g., 408), a first circuit (e.g., 405) configured to communicate with an external power supply device (e.g., the adapter 310 of FIG. 3 and the adapter 410 of FIG. 4), a charging circuit (e.g., the second charger 404 of FIG. 4) configured to receive power from the external power supply device and charge the battery using the received power, a power sensor configured to measure an input current of the battery, and a processor (e.g., 406) configured to: transmit an initially requested current value and an initially requested voltage value to the external power supply device through the first circuit, receive a first input current value of the battery from the power sensor, transmit a first requested voltage value to the external power supply device through the first circuit based on a difference between the first input current value and the initially requested current value being out of a first range, receive a second input current value of the battery from the power sensor, determine whether a difference between the initially requested voltage value and the first requested voltage value is greater than a threshold (e.g., the third threshold in FIG. 11) based on a difference between the second input current value and the initially requested current value being out of the first range, and request the external power supply device for current decrease through the first circuit based on the difference between the initially requested voltage value and the first requested voltage value being greater than the threshold (e.g., the third threshold in FIG. 11).

When the difference between the initially requested voltage value and the first requested voltage value is greater than the threshold (e.g., the third threshold in FIG. 11), the processor may be configured to transmit a first requested current value that is less than the initially requested current value to the external power supply device through the first circuit.

When the difference between the initially requested voltage value and the first requested voltage value is less than or equal to the threshold (e.g., the third threshold in FIG. 11), the processor may be configured to transmit a second requested voltage value that is less than the first requested voltage value to the external power supply device through the first circuit.

When the difference between the second input current value and the initially requested current value is in the first range, the processor may be configured to allow the battery to continue to be charged with power supplied by the external power supply device based on the first requested voltage value.

The electronic device may further include a power gauge (e.g., 407) configured to determine state information of the battery.

When the external power supply device and the electronic device are electrically connected, the first circuit may receive external power supply device information (e.g., the adapter information of FIG. 8) from the external power supply device.

The processor may be configured to receive the determined state information from the power gauge, receive the external power supply device information from the first circuit, and determine the initially requested current value and the initially requested voltage value based on the state information and the external power supply device information.

The processor may be configured to determine whether the external power supply device supports a direct charging method using the external power supply device information.

The external power supply device information may include information associated with a voltage and current that may be supported by the external power supply device, and information as to whether the external power supply device supports the direct charging method.

According to various embodiments, a method of operating an electronic device (e.g., 400) may include: transmitting an initially requested current value to an external power supply device; receiving first power from the external power supply device and charging a battery (e.g., 408) using the received first power, and measuring an input current of the battery; transmitting a first requested current value to the external power supply device based on a difference between a first input current value of the battery and the initially requested current value being out of a first range; receiving second power from the external power supply device and charging the battery using the received second power, and measuring an input current of the battery; determining whether a difference between the initially requested current value and the first requested current value is greater than a threshold (e.g., the first threshold in FIG. 7) based on a difference between a second input current value of the battery and the initially requested current value being out of the first range; and requesting the external power supply device for voltage decrease based on a difference between the initially requested current value and the first requested current value being greater than the threshold (e.g., the first threshold in FIG. 7).

The requesting for voltage decrease may include transmitting a first requested voltage value that is less than an initially requested voltage value to the external power supply device.

The method may further include transmitting a second requested current value that is less than the first requested current value to the external power supply device based on the difference between the initially requested current value and the first requested current value being less than or equal to the threshold (e.g., the first threshold in FIG. 7).

The method may further include allowing the battery to continue to be charged with power of the external power supply device supplied based on the first requested current value when the difference between the second input current value and the initially requested current value is in the first range.

The method may further include receiving external power supply device information from the external power supply device when the external power supply device and the electronic device are electrically connected; and determining the initially requested current value based on state information of the battery and the external power supply device information.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a battery;

a first circuit configured to communicate with an external power supply device;

a charging circuit configured to receive power from the external power supply device and charge the battery using the received power;

a power sensor configured to measure an input current of the battery; and at least one processor comprising processing circuitry; and a memory storing instructions which, when executed individually and/or collectively by the at least one processor, controls the electronic device to:

transmit a target current value to the external power supply device through the first circuit, receive a first input current value of the battery from the power sensor, transmit a first current value to the external power supply device through the first circuit based on a difference between the first input current value and the target current value being out of a first predetermined range of current values, receive a second input current value of the battery from the power sensor, determine whether a difference between the target current value and the first current value is greater than a predetermined threshold based on a difference between the second input current value and the target current value being out of the first predetermined range of current values, and request a voltage decrease from the external power supply device, through the first circuit, based on the difference between the target current value and the first current value being greater than the predetermined threshold.

2. The electronic device of claim 1, wherein the memory stores instructions which, when executed individually and/or collectively by the at least one processor, controls the electronic device to:

transmit a target voltage value along with the target current value to the external power supply device through the first circuit, and transmit a first voltage value, which is less than the target voltage value, to the external power supply device through the first circuit based on the difference between the target current value and the first current value being greater than the predetermined threshold.

3. The electronic device of claim 1, wherein the memory stores instructions which, when executed individually and/or collectively by the at least one processor, controls the electronic device to:

based on the difference between the target current value and the first current value being less than or equal to the predetermined threshold, transmit a second current value less than the first current value to the external power supply device through the first circuit.

4. The electronic device of claim 1, wherein the memory stores instructions which, when executed individually and/or collectively by the at least one processor, controls the electronic device to:

based on the difference between the second input current value and the target current value being in the first predetermined range of current values, allow the battery to continue to be charged with power of the external power supply device supplied based on the first current value.

5. The electronic device of claim 1, further comprising:

a power gauge configured to determine state information of the battery, wherein, based on the external power supply device and the electronic device being electrically connected, the first circuit is configured to receive external power supply device information from the external power supply device, and the memory stores instructions which, when executed individually and/or collectively by the at least one processor, controls the electronic device to: receive the determined state information from the power gauge, receive the external power supply device information from the first circuit, and determine the target current value based on the determined state information and the external power supply device information.

6. The electronic device of claim 5, wherein the memory stores instructions which, when executed individually and/or collectively by the at least one processor, controls the electronic device to:

determine whether the external power supply device supports a direct charging method using the external power supply device information.

7. The electronic device of claim 5, wherein the external power supply device information comprises information associated with a voltage and current that the external power supply device is capable of supporting, and information as to whether the external power supply device supports a direct charging method.

8. The electronic device of claim 1, wherein the memory stores instructions which, when executed individually and/or collectively by the at least one processor, controls the electronic device to:

determine whether to charge the battery in a constant current mode by the charging circuit using state information of the battery.

9. The electronic device of claim 8, wherein the memory stores instructions which, when executed individually and/or collectively by the at least one processor, controls the electronic device to:

determine to charge the battery in the constant current mode by the charging circuit based on charging state information of the battery being less than a charging threshold, and determine to charge the battery in a constant voltage mode by the charging circuit based on the charging state information being greater than or equal to the charging threshold.

10. The electronic device of claim 1, wherein the external power supply device comprises an adapter configured to support a direct charging method.

11. An electronic device, comprising:

a battery;

a first circuit configured to communicate with an external power supply device;

a charging circuit configured to receive power from the external power supply device and charge the battery using the received power;

a power sensor configured to measure an input current of the battery;

at least one processor comprising processing circuitry; and a memory storing instructions which, when executed individually and/or collectively by the at least one processor, controls the electronic device to:

transmit a target current value and a target voltage value to the external power supply device through the first circuit, receive a first input current value of the battery from the power sensor, transmit a first voltage value to the external power supply device through the first circuit based on a difference between the first input current value and the target current value being out of a first predetermined range of current values, receive a second input current value of the battery from the power sensor, determine whether a difference between the target current value and the first current value is greater than a predetermined threshold based on a difference between the second input current value and the target current value being out of the first predetermined range of current values, and request a current decrease from the external power supply device, through the first circuit, based on the difference between the target voltage value and the first voltage value being greater than the predetermined threshold.

12. The electronic device of claim 11, wherein the memory stores instructions which, when executed individually and/or collectively by the at least one processor, controls the electronic device to:

based on the difference between the target voltage value and the first voltage value being greater than the predetermined threshold, transmit a first current value less than the target current value.

13. The electronic device of claim 11, wherein the memory stores instructions which, when executed individually and/or collectively by the at least one processor, controls the electronic device to:

based on the difference between the target voltage value and the first voltage value being less than or equal to the threshold, transmit a second voltage value less than the first voltage value to the external power supply device through the first circuit.

14. The electronic device of claim 11, wherein the memory stores instructions which, when executed individually and/or collectively by the at least one processor, controls the electronic device to:

based on the difference between the second input current value and the target current value being in the first predetermined range of current values, allow the battery to continue to be charged with power of the external power supply device supplied based on the first voltage value.

15. The electronic device of claim 11, further comprising:

a power gauge configured to determine state information of the battery, wherein, when the external power supply device and the electronic device are electrically connected, the first circuit is configured to receive external power supply device information from the external power supply device, and the memory stores instructions which, when executed individually and/or collectively by the at least one processor, controls the electronic device to: receive the determined state information from the power gauge, receive the external power supply device information from the first circuit, and determine the initially requested current value and the target voltage value based on the determined state information and the external power supply device information.

16. The electronic device of claim 15, wherein the external power supply device information comprises information associated with a voltage and current that the external power supply device is capable of supporting, and information as to whether the external power supply device supports a direct charging method.

17. The electronic device of claim 11, wherein the memory stores instructions which, when executed individually and/or collectively by the at least one processor, controls the electronic device to:

determine whether the external power supply device supports a direct charging method using the external power supply device information.

18. A method of operating an electronic device, comprising:

transmitting a target current value to an external power supply device;

receiving first power from the external power supply device, charging a battery using the received first power, and measuring a first input current of the battery;

transmitting a first current value to the external power supply device based on a difference between thea first input current value of the battery and the target current value being out of a first predetermined range of current values;

receiving second power from the external power supply device, charging the battery using the received second power, and measuring a second input current of the battery;

determining whether the difference between the target current value and the first current value is greater than a predetermined threshold based on the second input current value of the battery and the target requested current value being out of the first predetermined range of current values; and requesting the external power supply device for a voltage decrease based on the difference between the target current value and the first current value being greater than the predetermined threshold.

19. The method of claim 18, wherein the requesting for voltage decrease comprises:

transmitting a first voltage value less than a target voltage value to the external power supply device.

20. The method of claim 18, further comprising:

transmitting a second current value less than the first current value to the external power supply device based on the difference between the target current value and the first current value being less than or equal to the predetermined threshold.

* * * * *